(12) United States Patent
Naibo

(10) Patent No.: US 10,033,714 B2
(45) Date of Patent: Jul. 24, 2018

(54) CONTEXTUAL NAVIGATION FACETS PANEL

(71) Applicant: Business Objects Software, Ltd., Dublin (IE)

(72) Inventor: Alexis Naibo, Levallois-Perret (FR)

(73) Assignee: Business Objects Software, Ltd, Dublin (IE)

( * ) Notice: Subject to any disclaimer, the term of this patent is extended or adjusted under 35 U.S.C. 154(b) by 338 days.

(21) Appl. No.: 14/856,972

(22) Filed: Sep. 17, 2015

(65) Prior Publication Data

US 2016/0373423 A1 Dec. 22, 2016

Related U.S. Application Data

(60) Provisional application No. 62/180,288, filed on Jun. 16, 2015, provisional application No. 62/180,285, filed on Jun. 16, 2015.

(51) Int. Cl.
*G06F 17/30* (2006.01)
*H04L 29/06* (2006.01)
*G06F 17/27* (2006.01)

(52) U.S. Cl.
CPC .......... *H04L 63/08* (2013.01); *G06F 17/2705* (2013.01); *G06F 17/277* (2013.01); *G06F 17/3064* (2013.01); *G06F 17/30424* (2013.01); *G06F 17/30528* (2013.01); *G06F 17/30539* (2013.01); *G06F 17/30554* (2013.01);
(Continued)

(58) Field of Classification Search
CPC ......... G06F 17/30011; G06F 17/30696; G06F 17/30592; G06F 17/30991; G06F 17/30536; G06F 17/30554; G06F 17/30424; G06F 17/30539; G06Q 30/02; G06Q 30/0201; G06Q 30/0204
See application file for complete search history.

(56) References Cited

U.S. PATENT DOCUMENTS 5,485,564 A 1/1996 Miura et al.
6,587,102 B2 7/2003 Taylor et al.
(Continued)

OTHER PUBLICATIONS

Junwei Bao et al., Constraint-Based Question Answering with Knowledge Graph, Proceedings of COLING 2016, the 26th International Conference on Computational Linguistics: Technical Papers,pp. 2503-2514, Osaka, Japan, Dec. 11-17, 2016.*
(Continued)

*Primary Examiner* — Srirama Channavajjala
(74) *Attorney, Agent, or Firm* — Brake Hughes Bellermann LLP

(57) ABSTRACT

A computer-implemented method for generating a contextual panel interface with a first interactive display portion for depicting a plurality of selectable datasets associated with the query context, a second interactive display portion for depicting a plurality of selectable measures associated with the query context and with at least one of the plurality of selectable datasets, a third interactive display portion for depicting a plurality of selectable dimensions associated with the query context and with at least one of the plurality of selectable datasets, and an interactive tool display portion configured to determine a query context in response to receiving a search query and to populate the first, second, and third interactive display portions.

17 Claims, 14 Drawing Sheets

(52) U.S. Cl.
CPC .. *G06F 17/30557* (2013.01); *G06F 17/30592* (2013.01); *G06F 17/30625* (2013.01); *G06F 17/30654* (2013.01); *G06F 17/30675* (2013.01); *G06F 17/30958* (2013.01); *H04L 63/102* (2013.01)

(56) References Cited

U.S. PATENT DOCUMENTS

| | | | |
|---|---|---|---|
| 6,859,937 | B1 | 2/2005 | Narayan et al. |
| 7,917,462 | B1* | 3/2011 | Shatdal ............. G06F 17/30592 707/600 |
| 8,051,073 | B2* | 11/2011 | Tunkelang ........ G06F 17/30424 707/722 |
| 8,898,140 | B2 | 11/2014 | Cooper et al. |
| 8,935,249 | B2* | 1/2015 | Traub ................ G06F 17/30657 707/737 |
| 2002/0016924 | A1* | 2/2002 | Shah ................. G06F 17/30592 726/3 |
| 2005/0041027 | A1* | 2/2005 | Chickering ........... G06T 11/206 345/440 |
| 2006/0282411 | A1* | 12/2006 | Fagin ................ G06F 17/30592 |
| 2008/0027788 | A1* | 1/2008 | Lawrence ............. G06Q 30/02 705/7.33 |
| 2008/0294596 | A1* | 11/2008 | Xiong ............... G06F 17/30427 |
| 2009/0012842 | A1* | 1/2009 | Srinivasan .......... G06F 17/2785 705/12 |
| 2009/0033664 | A1* | 2/2009 | Hao ..................... G06T 11/206 345/440 |
| 2009/0043749 | A1 | 2/2009 | Garg et al. |
| 2011/0137919 | A1* | 6/2011 | Ryu .................. G06F 17/30958 707/748 |
| 2012/0158633 | A1* | 6/2012 | Eder .................... G06F 19/3437 706/46 |
| 2014/0188935 | A1 | 7/2014 | Vee et al. |
| 2014/0250053 | A1* | 9/2014 | Averbuch ........... G06F 17/30592 707/600 |
| 2016/0063081 | A1* | 3/2016 | Rudolf ............. G06F 17/30563 707/602 |
| 2016/0063093 | A1 | 3/2016 | Boucher et al. |
| 2016/0103902 | A1* | 4/2016 | Moser .............. G06F 17/30572 707/602 |
| 2016/0373456 | A1 | 12/2016 | Vermeulen et al. |

OTHER PUBLICATIONS

Trieu et al., "Enterprise telesales opportunity pipelines performance management", ICEBE 06 IEEE Inernational conference on e-business enginerring, Oct. 2006 pp. 433-441.*
Non-Final Office Action for U.S. Appl. No. 14/856,984, dated Apr. 2, 2018, 19 pages.

* cited by examiner

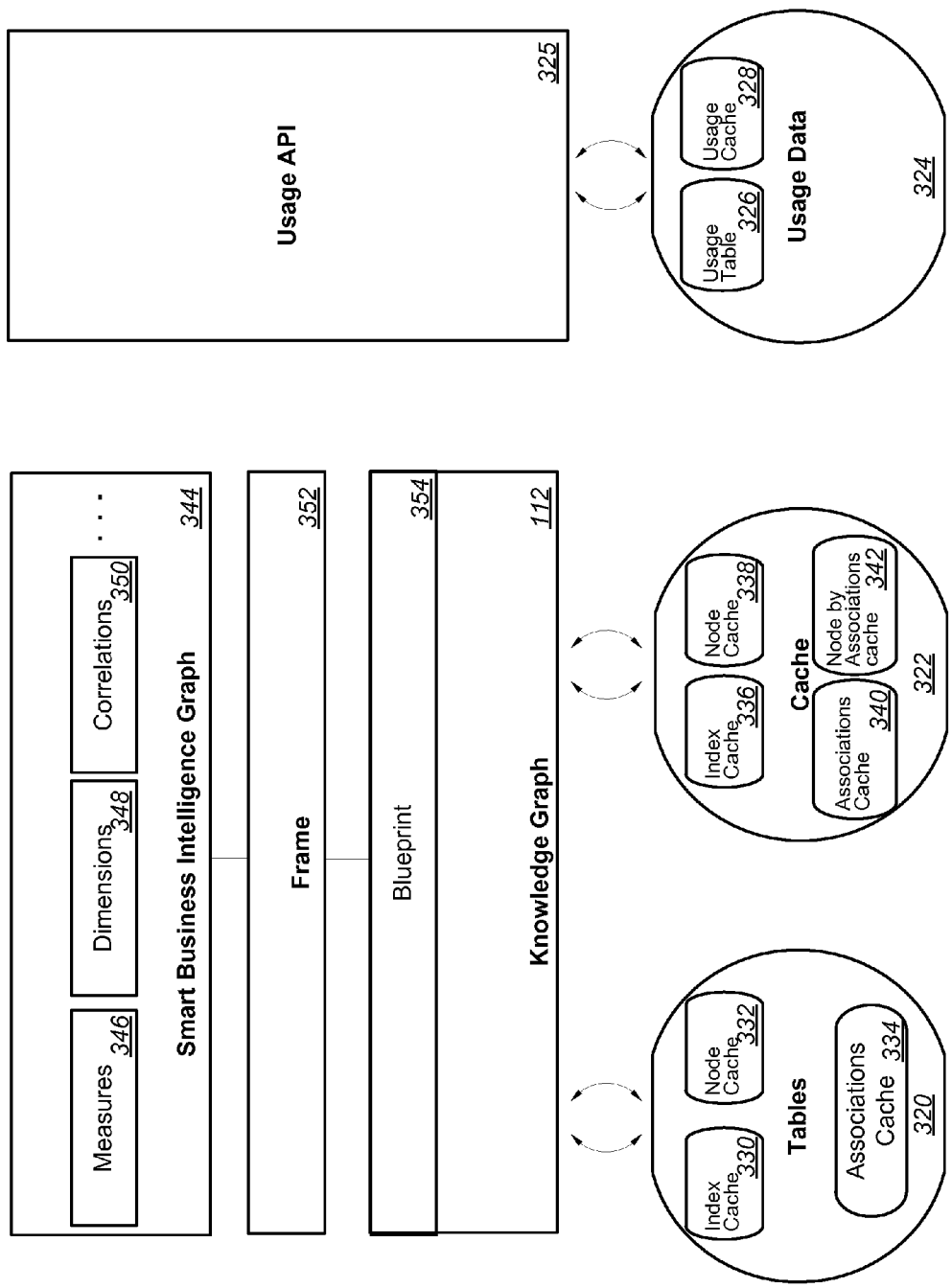

CONTEXTUAL NAVIGATION FACETS PANEL

CROSS REFERENCE TO RELATED APPLICATIONS

This application claims the benefit of U.S. Provisional Application No. 62/180,288, filed Jun. 16, 2015, and U.S. Provisional Application No. 62/180,285, filed Jun. 16, 2015, the entire contents of which are incorporated by reference in their entirety.

TECHNICAL FIELD

This description relates to a contextual navigation interface.

BACKGROUND

Large organizations tend to collect large amounts of data. Users accessing this data may be inclined to review a portion of data and may overlook data that can provide guidelines for appropriately accessing such data. In such a situation, sophisticated data solutions are in demand to quickly and accurately provide access to data desired by users.

SUMMARY

According to one general aspect, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method that includes obtaining a first query context, initiating, at a user interface, execution of a software application implementing a plurality of business processes associated with a plurality of business objects, and displaying, in the user interface, a contextual panel interface adjacent to a graphical depiction of the first query context. The method also includes in response to receiving input, at the contextual panel interface and from a user of the software application, generating a search query using at least a portion of the input and the first query context. The method further includes selecting a portion of the plurality of business objects, the portion being selected based at least in part on the input, determining compatibility between a plurality of attributes associated with the portion of the plurality of business objects, and generating, for display, an updated user interface that includes a second query context based on the determined compatibility and an updated contextual panel interface that includes interactive controls corresponding to one or more datasets and a plurality of measures and a plurality of dimensions. The method additionally includes displaying, to the user, the updated user interface in the software application. Other embodiments of this aspect include corresponding computer systems, apparatus, and computer programs recorded on one or more computer storage devices, each configured to perform the actions of the methods.

Implementations may include one or more of the following features. The method as described above in which determining compatibility between a plurality of attributes associated with the portion of the plurality of business objects includes generating the second query context associated with the plurality of attributes, obtaining at least two datasets that include at least one common attribute, from the plurality of attributes, and obtaining a plurality of measures and a plurality of dimensions based at least in part on the second query context and the at least two datasets. The method as described above in which a plurality of measures include a plurality of data objects that quantitatively define at least one attribute in the one or more datasets. The method as described above in which the plurality of dimensions include a plurality of data categories for at least one attribute in the one or more datasets. The method may further include sorting the one or more datasets, the sorting based at least in part on usage metrics associated with the user, sorting the plurality of measures, the sorting based at least in part on usage metrics associated with the user, sorting the plurality of dimensions, the sorting based at least in part on usage metrics associated with the user, and displaying, in the updated user interface in the software application, the sorted one or more datasets, the plurality of measures, and the plurality of dimensions.

Implementations may include one or more of the following features. The method as described above in which usage metrics include a measured time-based statistic, associated with the user, corresponding to accessing one or more attributes within the one or more datasets, the plurality of measures, or the plurality of dimensions. The method as described above in which obtaining a first query context includes automatically analyzing a plurality of datasets by accessing a knowledge graph to calculate compatibility between portions of the plurality of datasets. The method as described above in which generating a second query context associated with the plurality of attributes includes automatically accessing a knowledge graph to select additional business objects determined to be compatible with the portion of the plurality of business objects, the compatibility based at least in part on predefined similarity nodes and edges in the knowledge graph. The method as described above further including blending one or more datasets based at least in part on determining that one or more measures or dimensions overlap between the one or more datasets. The method as described above and further including in response to receiving additional input at one of the interactive controls, using the additional input to filter out datasets, measures, and dimensions that do not share a query context with data associated with the additional input, generating, for display, an additional updated user interface that includes a third query context and an additional updated contextual panel interface that includes interactive controls corresponding to the additional input, and displaying, to the user, the additional updated user interface in the software application. The method as described above and further including removing one or more business objects from the portion of the plurality of business objects based on determining insufficient security credentials for the user of the software application, where the removal terminates access, for the user of the software application, to the one or more business objects.

One general aspect includes a context management system including instructions stored on a non-transitory computer-readable storage medium, the system including a query context engine configured to determine a query context associated with data provided in a user interface, the query context determined by accessing a knowledge graph to compare the data to associations defined in the knowledge graph, a contextual panel generator configured to initiate execution of a search query on a software application implementing a plurality of business processes and provide a graphical display associated with a contextual panel interface according to the query context, and a security engine configured to determine whether a user accessing the contextual panel interface is authorized to access data in the contextual panel.

Other embodiments may include a security engine is further configured to remove at least a portion of the data from the contextual panel interface in response to determining insufficient security credentials. Other embodiments may further include a system for comparing the data to associations defined in the knowledge graph includes determining associations between information stored in the knowledge graph and determining which of those associations are compatible with the data. Other embodiments may include the query context engine configured to monitor the query context in response to receiving user input and modify the query context if the input causes changes in the associations between information stored in the knowledge graph. In some embodiments, the system may include a contextual panel interface that includes a first interactive display portion for depicting a plurality of selectable datasets associated with the query context, a second interactive display portion for depicting a plurality of selectable measures associated with the query context and with at least one of the plurality of selectable datasets, a third interactive display portion for depicting a plurality of selectable dimensions associated with the query context and with at least one of the plurality of selectable datasets, and an interactive tool display portion configured to determine a query context in response to receiving a search query and to populate the first, second, and third interactive display portions. Other embodiments of this aspect include corresponding computer systems, apparatus, and computer programs recorded on one or more computer storage devices, each configured to perform the actions of the methods.

Another general aspect includes a non-transitory recordable storage medium having recorded and stored thereon instructions that, when executed, perform actions of obtaining a first query context, initiating, at a user interface, execution of a software application implementing a plurality of business processes associated with a plurality of business objects, and displaying, in the user interface, a contextual panel interface adjacent to a graphical depiction of the first query context, in response to receiving input, at the contextual panel interface and from a user of the software application, generating a search query using at least a portion of the input and the first query context, selecting a portion of the plurality of business objects, the portion being selected based at least in part on the input, determining compatibility between a plurality of attributes associated with the portion of the plurality of business objects, generating, for display, an updated user interface that includes a second query context based on the determined compatibility and an updated contextual panel interface that includes interactive controls corresponding to one or more datasets and a plurality of measures and a plurality of dimensions, and displaying, to the user, the updated user interface in the software application. Other embodiments of this aspect include corresponding computer systems, apparatus, and computer programs recorded on one or more computer storage devices, each configured to perform the actions of the methods.

The details of one or more implementations are set forth in the accompanying drawings and the description below. Other features will be apparent from the description and drawings, and from the claims.

BRIEF DESCRIPTION OF THE DRAWINGS

FIGS. 3A-3B represent data flows used to generate a knowledge graph.

DETAILED DESCRIPTION

Figure 1:
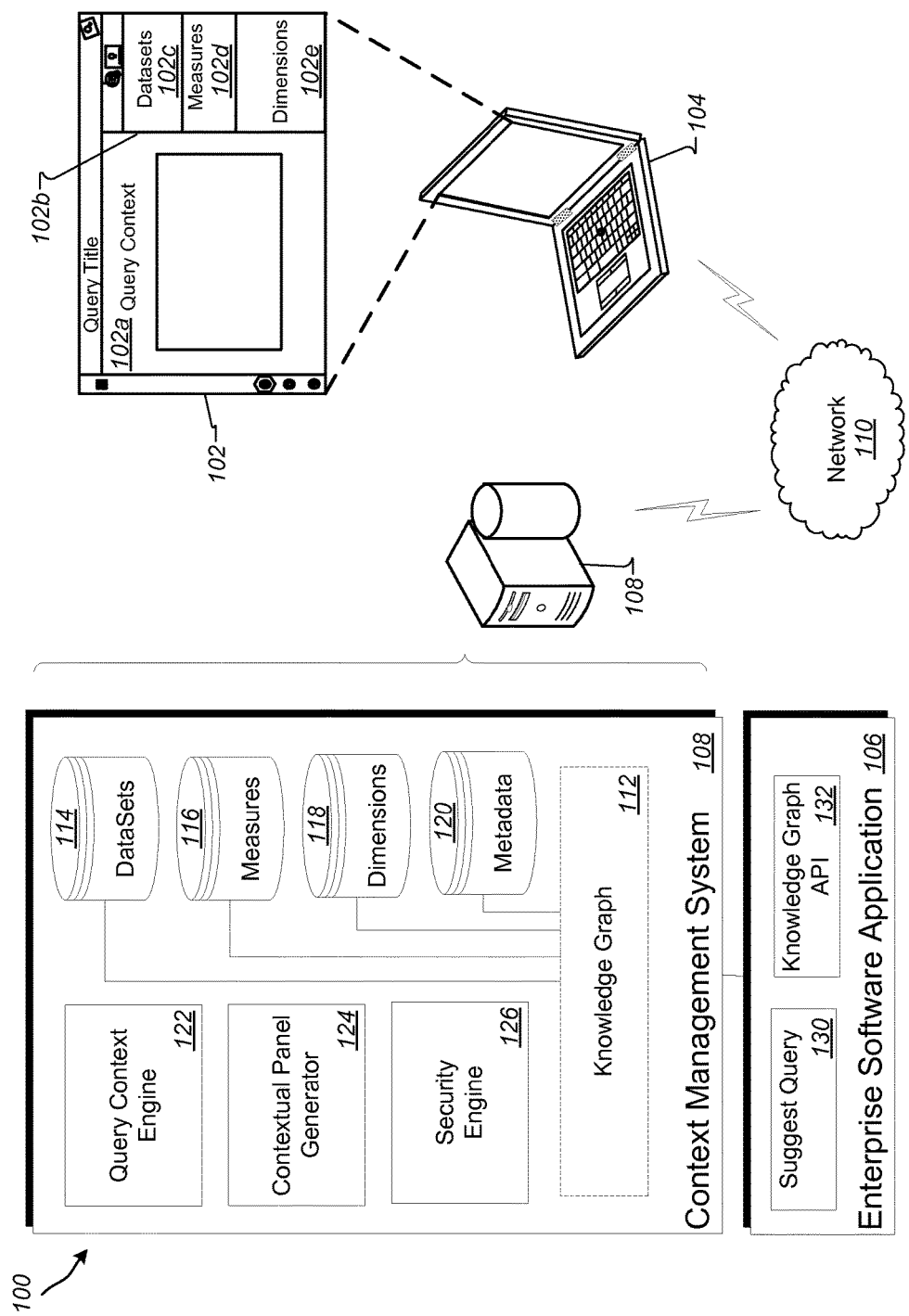
FIG. 1 is a block diagram of a system for providing a contextual user interface associated with business software executing at a client device.

Many businesses and organizations may utilize services (e.g., software applications) to search and display information associated with particular business processes. The services may be offered as user interfaces (UIs) that provide access to a number of knowledge bases. For example, a user may desire access to (via a frontend client device) regional financial data within several world regions having information stored on a number of different repositories. As other examples, the user may also desire access to applications for managing customer relationships, financial management, management of projects, management of supply chain networks, management of supplier relationships, support for executive management, and management of compliance with laws and regulations.

Accessing one or more applications to obtain relevant data (e.g., business object data) from the vast amount of stored data can be a complex task for a user. Obtaining such business object data may include performing searches against data associated with the one or more applications. The systems and methods described in this disclosure can assist the user in the form of providing contextual information (e.g., query context) about user-based queries pertaining to business data. Providing the user with a query context with which to navigate data can offer an advantage of allowing the user to access multiple sets of data without having to determine whether any part of the sets of data are compatible or comparable. The systems and methods described in this disclosure can perform compatibility determinations and provide relevant data without burdening the user with the analysis of comparing data, data fields, data attributes, data categories, etc. In short, the systems and methods described in this disclosure can provide contextually relevant data based on user credentials, user input, user location within data, and associations between data stored in a knowledge graph.

In one example, the systems and methods described in this disclosure can assist a user attempting to retrieve data from an enterprise software system. For example, the systems and methods can determine a particular query context associated with the user and data that the user may be selecting, provide data content that pertains to the query context, and provide an updated query context and associated selectable data to the user in an interactive format via a user interface. In particular, the systems and methods described in this disclosure can provide contextual navigation cues and displays in the form of a contextual user interface that is overlaid (e.g., as a contextual panel) adjacent to a graphical depiction of a determined query context. Navigation cues may pertain to data hierarchies that may be presented to the user to indicate a context associated with the datasets being presented. Example navigation cues can include hierarchical lists to indicate a data path (within a knowledge graph or underlying data hierarchy) in which particular data is retrieved. The data path may be associated with a business object, a software application, a search query term, a time period, etc. The navigation cues can be used to indicate to the user a data location area being accessed and to indicate selectable options for the user with which to navigate or interact within the context of a user-provided question or query. The context of the user-provided question, query, or data selection may be referred to as the query context.

The user can access data content (e.g., business objects/data sets and measures and dimensions associated with the datasets) by interacting with the contextual panel. In this fashion, the systems and methods described herein can provide access to one or more organized knowledge bases (e.g., repositories, knowledge graphs, etc.) that provide information to the user based on a context that the user may wish to invoke. The context may be user-directed or system inferred, examples of which are described in detail below. In addition to searching repositories to find resources that match the user-entered question or query, the systems and methods described herein can find relevant content by creating new queries, providing guidance to the user, and visually or textually describing the context of any provided content.

A search query as used herein can be built by a user and can include one or more terms or questions that can be used to retrieve data from a dataset. In one example, the user can trigger the systems described herein to generate query objects in near real time. The generated query objects can be used to build a near real time query (e.g., an ad hoc query in a business intelligence category). Such a query can be generated based on semantic metadata stored in a knowledge graph. The generated query can be used to trigger return of information from one or more repositories. The retrieved information can be used to build answers to a particular received search query. The answers can be executed against business intelligence data models (e.g., view, dataset, Lumira documents, etc.) and can be displayed as a visualization of data in a user interface.

The knowledge bases may include a plurality of repositories stored across any number of servers and networks. In some implementations, the knowledge bases may include one or more knowledge graphs constructed based on context and business object compatibilities. For example, the one or more knowledge graphs may be constructed and indexed based on information that lists whether particular data (e.g., business objects, datasets, measures, dimensions, etc.) are compatible and/or combinable with other of such types of data. This can provide the advantage of filtering off particular metadata that may not be compatible with specific business objects, datasets, measures, dimensions, or users, etc. Filtering data in such a way can provide the user with relevant data geared to a specific context associated with the data being accessed and/or requested by the user.

Referring to FIG. 1, a block diagram of a system 100 is shown. The system 100 may be configured to provide a contextual user interface 102 associated with business software executing at a client device 104. The client device 104 can display the contextual user interface 102, which may be provided by enterprise software application 106 and/or context management system 108, each executing as one or more server devices.

The example contextual user interface 102 shown here includes a graphical depiction of a query context 102a corresponding to the context of the data being shown. The contextual user interface 102 also includes a contextual panel 102b for configuring and determining context information about data shown by query context 102a. The user can interact with contextual panel 102b to update, modify, or otherwise change the content (e.g., and context of the content) shown at query context 102a. For example, the user can select data provided in the panel 102b to modify the query context. Selecting the data can invoke data filtering and data merging operations. In some implementations, selections in panel 102b performed by the user can function to build a query that can be used to seek out particular data and provide a visualization of such data in user interface 102.

As shown, the contextual panel 102b includes datasets 102c, measures 102d, and dimensions 102e. Datasets 102c can include a list of selectable dataset names in the present query context. The present query context may refer to the context pertaining to data currently displayed to a user in panel 102b and interface 102. The list of selectable dataset names are associated with datasets that are compatible with the present query context. When datasets 102c are presented, an initial dataset is automatically selected by the system and this dataset is used to provide the present query context with respect to measures 102d and dimensions 102e. In some implementations, the initial dataset is used to set the present query context until a user selects more content from panel 102b.

In general, datasets may be presented as sorted data in area 102c based on usage data, alphabetical order, or chronological order, etc. Example sorted data may include sorting the data by list name. In some implementations, the datasets may be sorted by default based on usage associated with a current user of the system 100. In some implementations, scroll controls and search controls can be provided within datasets area 102c.

In some implementations, one or more datasets selected can be blended together in the event that the context management system 108 determines attributes and/or business objects overlap between datasets. If particular datasets have the possibility of being blended, the datasets 102c can be shown grouped and one radial selection (or other selectable componentry) can be provided for the grouped datasets. In some implementations, if the system 108 blends two datasets, corresponding measures and dimensions/filters can be blended as well, in the event that the underlying business data/objects being combined are compatible.

Measures 102d can include a list of selectable measure names. The measure names can be merged into a single selection in the event that two or more measure names are identical. For example, if two measures have the same name, (e.g., region name such as North America) the system 108 may simply display two datasets and one selectable control between both measures to indicate the merge. In the North America example, if two measures provide information about North America, the two measures can be merged and the corresponding datasets can be combined in one selectable dataset control. Measures provided for selection are generally within the query context configured based on which datasets are selected. In some implementations, a user can select several measures to be included in data presented in interface 102. However, selecting one or more measures can affect other data presented in interface 102 and/or panel 102b.

Similar to datasets above, measures may be sorted based on usage data, alphabetically ordered, or chronologically ordered, and in some implementations, measures may be sorted by default based on usage associated with a current user of the system 100. For example, a usage table corresponding to previous user actions in the system 108 can be used to provide context. In some implementations, scroll controls and search controls can be provided within measures area 102d.

Dimensions 102e can include a list of selectable dimension names. Similar to measures 102d, dimensions 102e can be visually and actually merged based on naming conventions. Dimensions can include two selection modes. The first selection mode can cause the dimension to be used in interface 102 as an axes (e.g., by country). The second selection mode can cause the dimensions to be used as a filter (e.g., for Q3/2014 as Quarter/Year). For example, selecting a dimension can cause an axes or value to be modified within data depicted in interface 102. In this fashion, selecting dimensions 102e can function to filter data.

Selected dimensions can be used in the query context by axes or by values. Multiple dimensions can be selected at any given time. A dimension may be selected automatically by the system if the dimension is used in one of the query axes (e.g., by) or at least one value associated with the dimension is selected. In some implementations, selected dimension values may be displayed to provide a visual hint to the user for which values/metrics are being selected and/or gathered. Hierarchical dimensions can be displayed as with any hierarchical visual display (e.g., year/quarter). A list of values may be provided in a pop-up window in the event that the user clicks on a filter signal. In some implementations, the list of values can display a joined dimension between two sources and may return a full-outer join between those two dimensions. In some implementations, the system 108 can perform a disambiguation of the data source to display a list of value. For example, indeed dimensions having the same name, but pointing to different data sources can be visually merged and may be disambiguated by the system 108 to make the merge clear to the user.

Similar to datasets and measures above, dimensions may be sorted based on usage data, alphabetically ordered, or chronologically ordered, and in some implementations, dimensions may be sorted by default based on usage associated with a current user of the system 100. In some implementations, scroll controls and search controls can be provided within dimensions area 102e.

The example system 100 also includes a knowledge graph 112 with access to a number of repositories including, but not limited to datasets repository 114, measures repository 116, dimensions repository 118, and metadata repository 120. In general, the knowledge graph 112 may be implemented using any suitable software constructs. In a non-limiting example, the knowledge graph 112 may be constructed using object oriented constructs in which each node is a business object with associated functions and/or variables. Edges of knowledge graph 112 may represent business objects that have associated functions and variables. In some implementations, data contained in the knowledge graph 112 can be constructed of edges and nodes and can be stored in any suitable number of data repositories across one or more servers located in one or more geographic locations coupled by any suitable network architecture. As used herein, a business object refers generally to a construct of data and a methodology regarding how to interact with the data. The knowledge graph 112 can include business object data and associating data for such business objects.

Figure 3A:
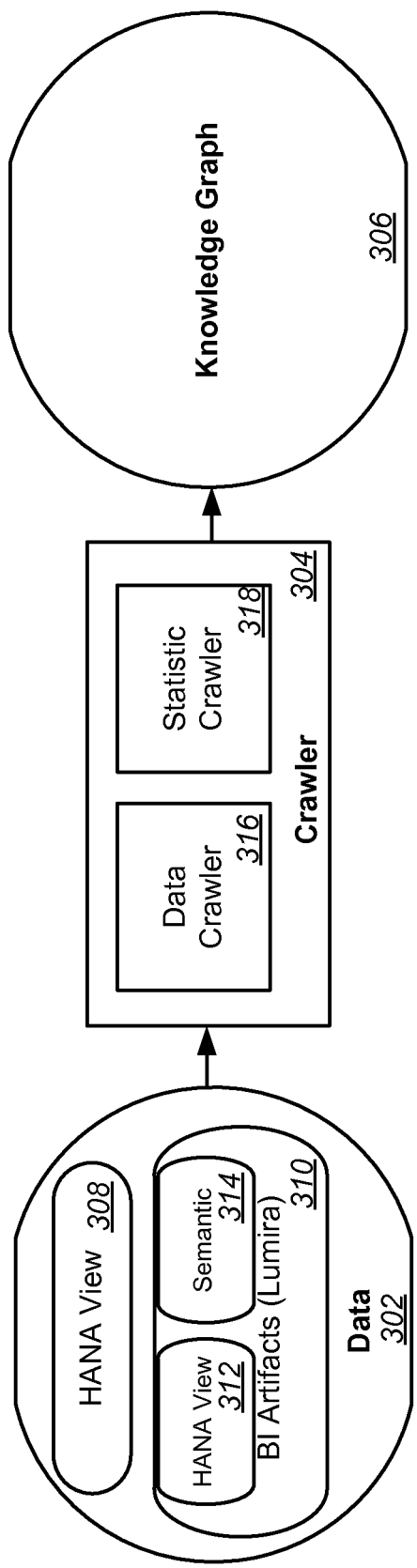

The datasets repository 114 represents a collection of data used to generate charts, knowledge graph content, and or metadata describing semantic enhancements or enrichments. For example, the dataset repository 114 can contain time and geography hierarchies, measures, formulas, and calculations, just to name a few examples. An example dataset repository is shown in FIG. 3A at 302. The datasets may include views such as HANA Views or business intelligence artifacts, such as Lumira.

The measures repository 116 represents data objects that represent quantitative data in a dataset. For example, the measures repository 116 can include metrics such as sales revenue, salary, inventory stock, or number of employees, just to name a few examples. In some implementations, the measure repository 116 includes a plurality of data objects that quantitatively define at least one attribute within a number of datasets. Creating measures and hierarchies of measures can enrich datasets by adding measures and time-based data. Measures can allow for a standard way of manipulating data calculations. Hierarchies can enable a user to use and view a natural grouping of related data.

The dimensions repository 118 represents dimension data objects that represent categorical data in a dataset. Example dimensions may include categories such as products for a region or sales for a region. In some implementations, the dimensions repository 118 includes dimensions that define a plurality of data categories for at least one attribute in a number of datasets.

The metadata repository 120 represents data associated with one or more datasets, measures, and/or dimensions. The metadata may describe semantic enhancements or enrichments to the datasets, measures, and/or dimensions. For example, a dataset can contain metadata that defines time and geography hierarchies, measures, formulas, and calculations, just to name a few examples.

In the example system 100, the context management system 108 also includes a query context engine 122, a contextual panel generator 124, and a security engine 126. In some implementations, the security engine 126 and/or the query context engine 122 may be provided external to context management system 108.

The query context engine 122 is configured to determine a query context associated with data provided in user interface 102, for example. The data provided in user interface 102 may be system-generated, user-entered, or a combination of both. In one example, the query context engine 122 can determine a context (e.g., query context) associated with datasets presented at datasets 102c. The query context can be used by system 100 to facilitate user understanding of a particular context being used for displaying content in panel 102b. The system 100 can be used to combine data, add measures, dimensions, or values to the interface of panel 102b and with each addition, a query context is monitored. The query context can provide relevant information to the user based on where the user is accessing data in the system 100.

Determining the query context can include using a combination of data and data sources to ascertain context from the data. For example, one way to determine the query context can include accessing a knowledge graph to compare the selected and displayed data from user interface 102 with data (e.g., nodes and edges) in the knowledge graph 112. The comparison can include determining associations between information stored in the knowledge graph and determining which of those associations are compatible with the data displayed in user interface 102 (e.g., within contextual panel 102b). In some implementations, the comparison can include determine an identity of a user accessing user interface 102 to determine historical usage metrics associated with the enterprise software application 106, or context management system 108. The usage metrics may pertain to historical data access, previously suggested queries and/or previously user-edited queries, or a present query combined with the identification of the user. Determining user identification can include retrieving data about the user from login credentials or other repository storing user data. The retrieved data can be used to obtain the user's job title, management statistics, security groups, hierarchy within a group, etc. Any of this gathered data can be used to determine and provide a relevant query context to the user.

In some implementations, the user can continue to select other data from contextual panel 102b to further modify the query context. In particular, the user can modify the query context by using interface 102 and contextual panel 102b to perform searches (e.g., using free form text), add filters, and/or otherwise interact with questions/queries in the visualization of user interface 102. The query context engine 122 can redefine the query context using the input and provide updated information to the user. The user can provide any or all of the above input to modify the query context. The query context engine 122 can use user interface 102 and contextual panel 102b to provide intuitive data to facilitate user interactions with enterprise software application 106 to obtain a new or updated query context. For example, contextual panel 102b can be used to narrow or broaden the scope of data with respect to the query context.

In a non-limiting example, modifying the query context can include selecting additional data presented in datasets 102c, measures 102d, and/or dimensions 102e to filter in or filter out additional business data. For example, if the user chooses to add another dataset (i.e., data facet) to the query context, the user can select the additional dataset from datasets 102c and system 100 can modify the query context displayed to the user by adding to the display one or more additional measures 102d and/or dimensions 102e that are compatible with the selected/added datasets. Data compatibility determinations can be performed by query context engine 122.

The contextual panel generator 124 can be configured to provide an interactive contextual panel, such as panel 102b. The contextual panel generator 124 can function with the query context engine 122 to provide a graphical view of the query context associated with data being accessed in the panel 102b and user interface 102. In particular, the contextual panel generator 124 can provide context, data hierarchies, dataset names, and associations between any or all datasets 102c, measures 102d, and dimensions 102e.

The security engine 126 can be configured to determine whether a user accessing user interface 102 (and thereby accessing content in systems 106 or 106) is authorized to access particular data. For example, the security engine 126 can determine whether insufficient security credentials have been provided for a user of the software application. If the engine 126 determines that particular data cannot be accessed, the user interface 102 can be modified to exclude the data. That is, the security engine 126 can remove data from the panel 102b and/or, terminate view access to datasets, measures, dimensions, or any associated business objects.

In some implementations, the security engine 126 can access information provided by entities wishing to access context management system 108. For example, such information can include security model information, metadata describing sources of such information, and access control list data to be indexed as well as the access controls lists.

Once the query context is configured, the contextual panel generator 124 can generate a search query using at least a portion of received user input and/or the query context. The contextual panel generator 124 can determine one or more rules associated with the user and/or the query context and perform the search query according to the one or more rules. For example, the contextual panel generator can perform a search query according to user credential rules that allow secure access to a portion of repositories within an organization. The user credential rules may block particular repositories from being searched by the contextual panel generator 124 based on the user's access privileges.

Referring again to FIG. 1, the context management system 108 also includes (or has access to) enterprise software application 106. The enterprise software application 106 represents computer software used to satisfy the needs of a business organization. Enterprise application software 106 generally includes a collection of computer programs (i.e., software applications and repositories) with common business applications, tools for modeling how an organization functions, and development tools for building applications unique to the organization. The enterprise application software 106 can be used in combination with context management system 108 to improve enterprise productivity and efficiency by providing business logic support functionality and contextual query resolution.

Services provided by the enterprise software application 106 may include business-oriented tools such as query context management and search query management. Other services are possible including, but not limited to online shopping and online payment processing, interactive product management, automated billing systems, security, enterprise content management, IT service management, customer relationship management, enterprise resource planning, business intelligence, project management, collaboration, human resource management, manufacturing, enterprise application integration, and enterprise forms automation.

The enterprise software application 106 shown here includes a suggest query service 130 and a knowledge graph API service 132. Both services 130 and 132 can be configured to manipulate user interfaces (such as user interface 102) using stored data from system 108. In particular, the suggest query service 130 can transform a user query or question into query descriptions over existing datasets and artifacts in enterprise software application 106 and/or context management system 108. An associated query service (not shown) can function to retrieve data corresponding to the suggested query and used to provide visualization of the data to a user. A visualization recommendation service can be used to determine how a query could be properly visualized in a user interface. The suggested queries may be based on information stored in the knowledge graph 112. The knowledge graph 112 may be built from information that can be crawled from various data sources, or derived from usage.

The knowledge graph API service 132 can be provided to a number of entities that wish to utilize system 108 and application 106. Entities can push information to the knowledge graph 112 by sending information on a message bus. For example, to insert data into the knowledge graph 112, entities can send security model information, metadata describing the sources of information, and access control list data to be indexed as well as the access controls lists. In some implementations, the entities (e.g., source systems) may decide which information should be sent, and to which extent dimensions can be indexed. Information sent over the bus can be collected by dedicated collectors (not shown) that can store such information in the knowledge graph 112. The collectors may be deployable independently of one another to make scaling and graph updating convenient.

In operation, the context management system 108 in system 100 can be communicatively coupled to device 104. Device 104 can access system 108 and any associated software applications. Device 104 can be connected (wired or wirelessly) to system 108, which can provide business data, user interfaces, and facets for display. In some implementations, the computing device 104 can execute one or more applications on the context management system 108 and provide business content and/or services to computing device 104.

In some implementations, one or more additional content servers and one or more computer-readable storage devices can communicate with the computing devices 104 and 108 using network 110 to provide business content to the devices 104 and 108. In some implementations, the network 110 can be a public communications network (e.g., the Internet, cellular data network, dialup modems over a telephone network) or a private communications network (e.g., private LAN, leased lines). In some implementations, the computing devices 104, 108 can communicate with the network 110 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

Although only two computing devices are depicted in FIG. 1, the example system 100 may include a plurality of computing devices that can exchange data over a network 110 (or additional networks not shown). The computing devices 104 and 108 may represent clients or servers and can communicate via network 110, or other network. Example client devices may include a mobile device, an electronic tablet, a laptop, or other such electronic device that may be used to access business content from context management system 108. Each client device can include one or more processors and one or more memory devices. The client devices can execute a client operating system and one or more client applications that can access, control, and/or display business data on a display device included in each respective device. The context management system 108 may represent a server device. In general, the context management system 108 may include any number of repositories storing content and/or business software modules that can search, generate, modify (e.g., edit), or execute business software and associated business objects, data, and knowledge graphs.

Additional devices are possible and such devices may be configured to be substituted for one another. In some implementations, the devices 104 and 108 can be laptop or desktop computers, smartphones, personal digital assistants, portable media players, tablet computers, gaming devices, or other appropriate computing devices that can communicate, using the network 110, with other computing devices or computer systems.

Figure 2:
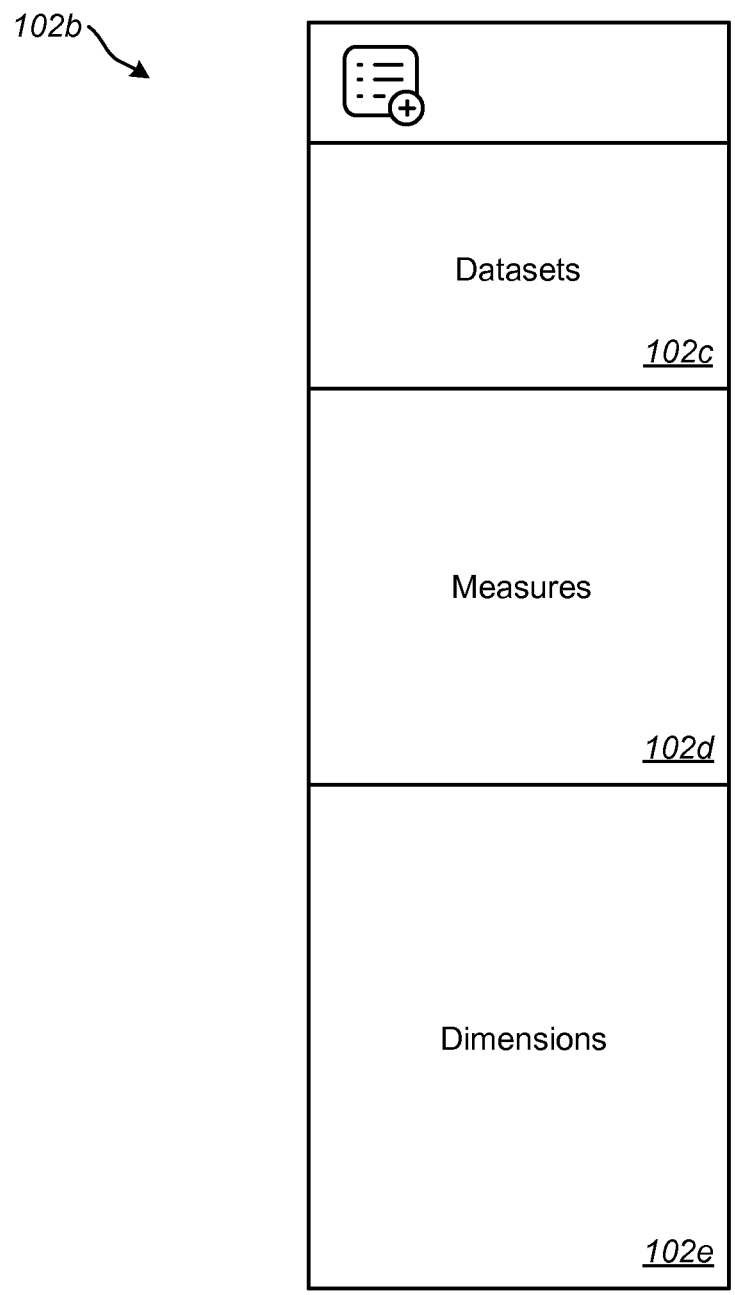
FIG. 2 is a screen shot illustrating an example display of a contextual panel for a contextual user interface.

FIG. 2 is a screen shot illustrating an example display of a contextual panel 102b for a contextual user interface (such as interface 102 in FIG. 1). In general, a contextual panel may represent an interactive user interface for depicting attributes or characteristics of one or more datasets in context with other system attributes or characteristics, with respect to business objects in an enterprise software application. The contextual panel 102b can provide facets of a dataset including, but not limited to other compatible datasets, measures, dimensions, calculations, and hierarchies, and any attributes or characteristics associated with such facets. As shown, the contextual panel 102b includes datasets 102c, measures 102d, and dimensions 102e, each of which are described throughout this disclosure.

The contextual panel 102b can be configured to facilitate user interaction with business datasets. For example, the contextual panel 102b can automatically ascertain particular data contexts and assist the user by automatically narrowing a search scope, combining content, or narrowing a knowledge base scope to the particular data contexts. This can allow the user to easily search for information across a variety of datasets and business objects without selecting or loading each relevant dataset (or business object) and without having to understand which datasets pertain to user-desired subject matter.

In some implementations, the contextual panel 102b can be configured to provide an interactive interface for questions or queries entered by a user by curating a list of datasets, objects, and values that the user can interact with or use in a search query. The contextual panel 102b can provide such an interface based on determining which business objects are often accessed, viewed, or requested by the user. In some implementations, the contextual panel 102b can merge datasets based on determined compatibility between data in the datasets. For example, to facilitate user understanding of a current query context being used for displaying content in panel 102b, the system 100 can combine data, add measures, dimensions, or values to the interface of panel 102b. Upon being provided additional content in the panel 102b, the user can continue to add to or modify the context of the query by adding additional measures, dimensions, and/or values. To provide the additional content for user selection, the system 100 can determine compatibility between particular datasets, measures, and dimensions, and provide compatible content for user selection.

Determining compatibility between particular content can include accessing a knowledge graph to determine relationships between measures, dimensions, and values within each dataset. The system 100 can determine this compatibility by analyzing one or more possible navigation paths within the knowledge graph to obtain compatible relationships between the measures, dimension, and values. A navigation path may refer to a data path traversed within the knowledge graph to connect similar content based on one or more predetermined query contexts. In some implementations, the contextual panel 102b can rely on an indexed view of knowledge graph data and/or metadata retrieved from a number of different sources, such as SAP Enterprise Service Search.

In some implementations, the contextual panel 102b is represented as an interactive contextual panel interface. The interactive contextual panel interface can include display portions corresponding to datasets. For example, the interactive contextual panel interface can include a first interactive display portion for depicting a plurality of selectable datasets associated with the query context. Similarly, the interactive contextual panel interface can include display portions corresponding to particular measures. For example, the interactive contextual panel interface can include may include a second interactive display portion for depicting a plurality of selectable measures associated with the query context and with at least one of the plurality of selectable datasets. The interactive contextual panel interface can include can additionally include a third interactive display portion for depicting a plurality of selectable dimensions associated with the query context and with at least one of the plurality of selectable datasets. In some implementations, the interactive contextual panel interface can include can also include an interactive tool display portion configured to determine a query context in response to receiving a search query and to populate the first, second, and third interactive display portions.

In some implementations, the contextual panel 102b can provide, to the user, an understanding of the current query context. In particular, the contextual panel 102b may provide a clear query context in the event that multiple datasets have been blended (e.g., joined/synchronized) together in the system 100. The current query context can be analyzed by system 100 to provide a holistic view of combined datasets for any number of business objects available and selectable by end-users, as described in detail the examples below.

In some implementations, the contextual panel 102b can provide one or more interactive user interfaces that display a summary and/or context of a particular dataset by listing one or more unique values for each dimension. For example, a dataset may include an example dimension of "Country" that contains multiple instances of the values "U.S.A.," "Canada," and "Mexico." If a user selects the "Country" dimension in the contextual panel, then the values "U.S.A.," "Canada," and "Mexico" may be displayed along with the number of times these values appear in the dataset.

The contextual panel 102b can be accessed by a user to interact with business content associated with provided in the panel 102b. For example, the user can perform filtering tasks by selecting particular content in the contextual panel 102b. Specifically, the user can select, for example, a measure from panel 102b. The system 100 can assess which measure is selected and determine whether the context of the user's selection (e.g., query by selection) can be modified from a current context of the query. In particular, the system 100 can receive the selection of the measure, determine which business objects, software modules, or other business data may be provided within the scope of the selected measure, and can change the context of the query and provide other or additional selectable datasets, measures, and/or dimensions, according to the modified context.

In a non-limiting example, a user can select a measure (not shown) from measures 102d. The selected measure can be added as an additional measure that can modify the query context. Similarly, users can select datasets or dimensions to modify the query context. Adding a dataset, measure, or dimension can function to add an axis to the query context. In addition, additional filters may be applied each time one or more datasets, measures, or dimensions are added and the filter can trigger modification of the query context. For example, if the user selects a dataset, the system 100 can display the query context based on the selected dataset. The selection of the dataset acts as a filter to the content being displayed in user interface 102b, for example. In some implementations, when the user selects the dataset (e.g., or any facet of datasets, measures, or dimensions), the system 100 can modify other data in panel 102b to maintain a consistent query context. In some implementations, the system 108 (e.g., query context engine 122) may use a determined context to retrieve or receive relevant data from particular datasets that do not match filter parameters exactly, but which match or conform to context parameters.

FIGS. 3A-3B represent data flows used to generate a knowledge graph. As shown in FIG. 3A, the system 100 can crawl (or otherwise obtain) data 302 using a crawler 304 to generate the knowledge graph 306. In general, the knowledge graph 306 can be built using statistics, usage data, dimension data, and measure data obtained from data 302 by linking the data 302 together via nodes and edges based on similarity and context. The data shown here includes a HANA repository 308 and a business intelligence artifacts repository 310 (e.g., Lumira). The business intelligence artifacts repository 310 includes a HANA View 312 and a semantic view 314. In general, metadata and/or semantic information can be extracted from data 302. The extracted content can be mapped as shown in FIGS. 3A and 3B into the knowledge graph model depicted in FIG. 4. In one example, the dataset 114 (could be a HANA View or a Lumira document) can be mapped to EntitySet 404. Similarly, the measure 116 can be mapped to measure 420. The dimension 118 can be mapped to dimensional attribute 424 and detail 422 while metadata 120 can be mapped to entities 426, 430, 432, 428, 434a, 434b, 436, 440, as indicated by connecting arrows shown in FIG. 4. The HANA View may include dimension, dimension attributes, measures, hierarchy, etc. Such information may be publically available on the Internet. The semantic may exist to explain that the system 100 can leverage additional metadata and/or semantic data, for example, on business intelligence artifacts, such as visualizations, query, story, etc. In some implementations, cache 322 may represent an engineering pattern used to improve performance via caching.

The crawler 304 includes a data crawler 316 and a statistic crawler 318. The data crawler 316 can crawl repositories in system 100 to gather information from any number of datasets being crawled via a preconfigured scheduler. In some implementations, the crawl can be performed in real time and a dataset can publish content in the knowledge graph during execution of a query, for example. The statistic crawler 318 can crawl repositories in system 100 to access statistical metrics and information. Such information may be stored in the knowledge graph 306 (e.g., knowledge graph 112) as edges and vertices/nodes that inherit respectively from the interfaces.

As shown in FIG. 3B, additional data can be accessed to generate knowledge graphs. The graph model shown here may be used to assess compatibility between datasets. The model includes system-stored tables 320, caches 322, and usage data 324 that can access a usage API 325. Usage data 324 can function to sort data (provided as search results) based on user usage data. This can ensure the user can easily access information often utilized by the user. The usage data 324 includes a usage table 326 and a usage cache 328. The usage table 326 may include scores indicating usage statistics and usage information about a user accessing system 106, for example. Usage data 324 and/or usage cache 328 may represent the usage of each object. Usage data 324 can be used to sort an object. The tables 320 include an index cache 330, a node cache 332, and an associations cache 334. The index cache 330 may be used to store attribute instances and tags pertaining to business objects associated with enterprise software application 106. The nodes cache 332 may be used to store particular graph nodes. The associations cache 334 may be used to store relationships between the nodes 332.

The cache 322 includes index cache 336, node cache 338, associations cache 340, and node by associations cache 342. The cache 322 components 330-342 include data that can be quickly accessed by the application 108. The cache 322 includes the node by associations cache 342, which can be configured to store all nodes for an association.

The smart business intelligence graph 344 can include all interface information for graph elements including, but not limited to measures 346, dimensions 348, and correlations 350. For each component 346-350, the system can store a full text index for a dataset name, measure name, dimension name and dimension values in order to handle homonymy via name merges. For example, the system 108 can access the tables index 320 and cache index 322 to merge common names for datasets so that one dataset can be presented to the user without repetitively providing datasets with the same name across many business objects and business units.

The smart business intelligence graph 344 can provide data via a frame 352 to the knowledge graph 112. The frame 352 may represent an API that overcoats the knowledge graph 112. The knowledge graph 112 generally includes nodes and associations (not shown) that allow traversal of information in the graph to find compatible associations. For example, the context management system 108 can traverse the knowledge graph 112 in order to calculate compatibility/link-ability of nodes in the graph for particular workflows. The workflow may pertain to a link that associates a dataset to a measure or dimensional attribute. The link can be used to join data by associating the different columns and key of particular joins. By using a path finder between elements, the system 100 can trace the knowledge graph 112 to obtain a clear and valid data path between two elements in the graph. If a clear and valid data path cannot be obtained, the system 100 may conclude that the elements along such a path are not compatible.

A blueprint 354 is shown connected to knowledge graph 112. The blueprint can be used to create and manage the graph. In some implementations, the blueprint 354 may be used to build an implementation of FRAME on HANA.

Figure 4:
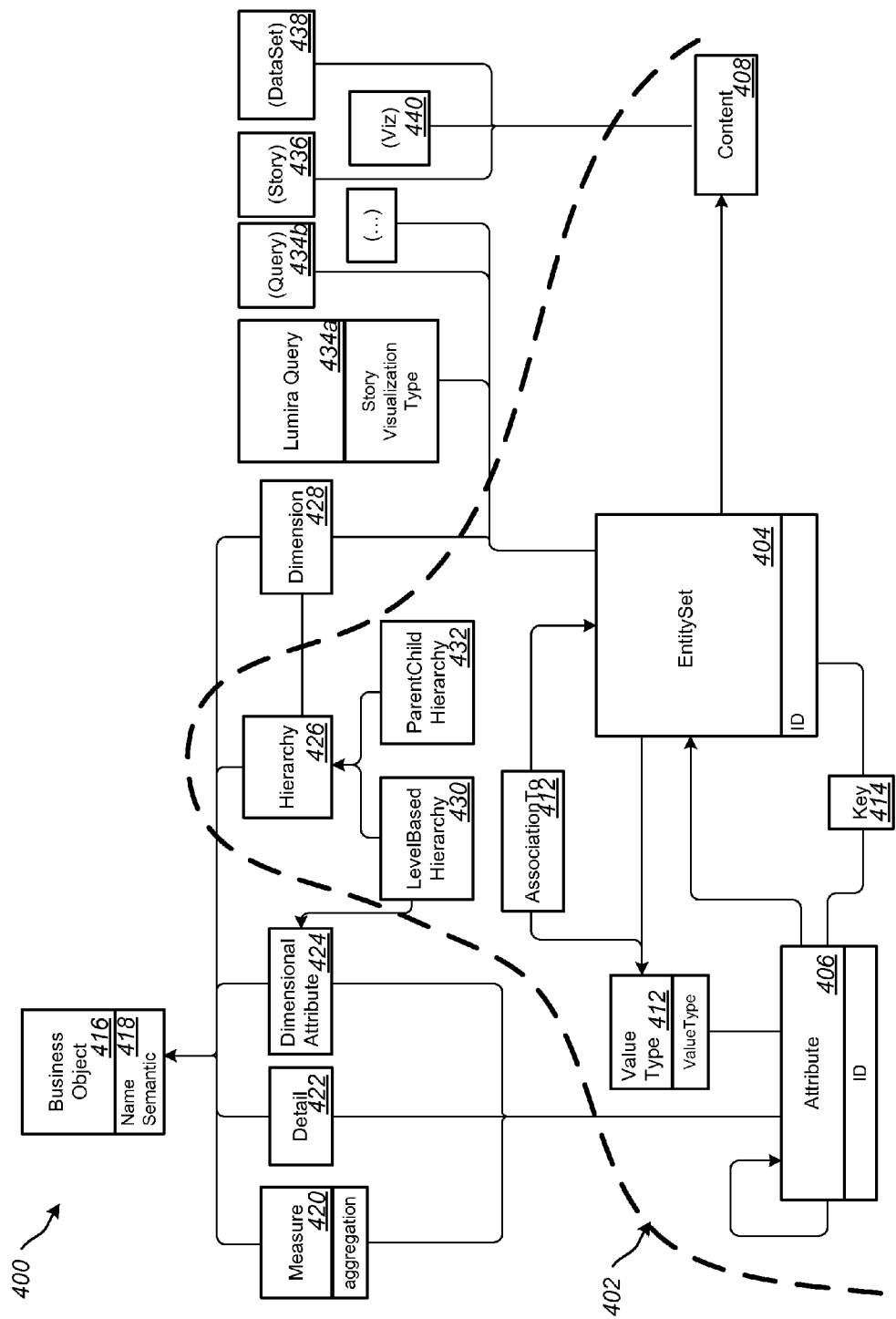
FIG. 4 is a semantic model illustrating an example of information used to generate a knowledge graph.

FIG. 4 is a semantic model 400 illustrating an example of information used to generate a knowledge graph. The model 400 may be used to determine whether two datasets can be merged/blended and provided as a combined dataset in the contextual panel 102b. In general, the model 400 can enable information to be managed through full text indexes, nodes, and associations.

The semantic model 400 includes a base model shown below a dotted line 402 and an annotations model, shown above the dotted line 402. The base model may describe structured entity sets. Entity sets may represent sets of entities with a common structure. In practice, the entity sets may include or be represented by tables, views, and queries. Entities may represent records made from attributes (e.g., columns, fields), which themselves can be entity sets within their own structure. Example entity types may include string or integer, and each type can be seen as specific entity sets.

Entity sets may be associated with keys (i.e., a subset of their attributes). An entity set with no key may be represented as a singleton.

The annotations model may represent a semantic layer on top of the base model, and can expose notions such as measures (i.e., attributes with an aggregation function), details (i.e., attributes which are not key, and thus can be viewed as a function of the key attributes of their entity set), dimensional attributes (i.e., used as associations to dimensions, as levels in hierarchies). In some implementations, attributes and entity sets may be annotated multiple times. Content nodes are included in the annotations model to represent specific containers to represent entity set instances.

As shown in FIG. 4, there are three node types, namely, entity sets 404, attributes 406, and content 408. When attributes are of type entity set, the information about their structure can be merged with the attribute "InnerEntitySet."

In some implementations, annotations and attributes appear collapsed because there may typically be one annotation for one attribute. In the event that the system 108 wishes to use more than one annotation for an attribute (an attribute that can be seen both as a measure and a dimension for instance), the system 108 can create aliases. Associations may be represented through a node associated with the attributes of each entity set that materialize the association (e.g., a foreign key in SQL with input columns mapped to a key).

As shown in the semantic model, attributes 406 can each include an identifier and can use notation to keep track of an origin of particular values and/or value types 410. The value type can target one or more entity sets 404 using association data 412. The attributes 406 can be cast onto entity sets 404 and keys 414 can be generated.

Business objects 416 may include name semantics, which can be determined and or defined by aggregated measures 420, details 422, dimensional attributes 424, hierarchies 426, and/or dimensions 428. Hierarchies 426 can receive data from level based hierarchies 430, as well as parent child hierarchies 432. Level based hierarchies 430 can provide data to define dimensional attributes 424.

Queries 434a and 434b, stories 436, and datasets 438 can be retrieved and/or received by application 108, for example. The received or retrieved data can be used to visualize 440 a query context to provide relevant content 408 to a user of user interface 102.

When model elements are transferred to clients, the following syntax (JSON serialization) may be used to describe model elements. Capitalized names correspond to non-terminals in the grammar (described later as NONTERMINAL:= . . . ). Field names followed by "?" are optional. Elements enclosed in square brackets are lists. The "with" syntax indicates that the new element extends/overrides the other with the specified information. The code snippet below shows an example of such syntax.

Code Snippet I

```
ENTITY_SET := {
    id?: ENTITY_SET_ID, // not used for inner entity sets
    type: ENTITY_SET_TYPE,
    kind?: ENTITY_SET_KIND, // not used for inner entity sets
    name?: string, // not used for inner entity sets, indexed
if present
    connectionId?: string // name of the connection giving access to the entity set
(should be usable by the query service)
    // not used for inner entity sets
entitySetId?: FQN, // Fully Qualified Name of the dataset in the system
identified by the connectionId
```

| Code Snippet I |
|---|

```
    // In Hana, this corresponds to the repository id of the view
    // Not used for inner entity sets
sqlId?: FQN, // Fully Qualified Name of the table/view, as used in a SQL query
(including schema information)
    // Not used for inner entity sets
    attributes: [ ATTRIBUTE_ID ],
    associations: [ ASSOCIATION ],
    keys?: [ KEY ] // no key => tuple set; empty keys:
singleton ; keys: indexed entity set
        <property> : <value> // represent "other" properties of the
entity set, stored in the graph
}
ENTITY_SET_ID := FQN // Fully Qualified Names correspond to the
id in the original system
ENTITY_SET_TYPE := "dataset" | "innerEntitySet" // dataset is used for top-level
entity sets
ENTITY_SET_KIND := "analyticView" | "attributeView" | "dimension" | "bi.query++" | ...
ATTRIBUTE := {
    id: ATTRIBUTE_ID,
    type: ATTRIBUTE_TYPE,
    name: string, // indexed
    valueType: ATTRIBUTE_VALUE_TYPE,
    uses: [ USES ],
    entitySet: FQN, // ENTITY_SET_ID or ATTRIBUTE_ID representing the defining
(inner) entity set
attributeId: LN, // attribute Local Name (id) in the entity set
// only for inner entity sets
    attributes?: [ ATTRIBUTE_ID ],
    keys?: [ KEY ] // no key => tuple set; empty keys:
singleton ; keys: indexed entity set
        <property> : <value> // represent "other" properties of the
attribute, stored in the graph
}
ATTRIBUTE_ID := FQN
ATTRIBUTE_TYPE := "measure" | "dimensionalAttribute" | "detail"
ATTRIBUTE_VALUE_TYPE := string | integer | double | float | fixed | date | time |
entitySet
USES : {
    attribute: ATTRIBUTE_ID,
    isEqual: boolean
}
KEY := [ ATTRIBUTE_ID ]
BO := {
        id: string,
        name: string, // indexed
            isAlias: true, // overridden by attributes
        aliasOf?: FQN, // iff isAlias is true
        <property> : <value>
    }
    MEASURE := BO with {
        type: "measure",
        semantic?: SEMANTIC,
        aggregation: AGGREGATION
    }
    MEASURE_ATTRIBUTE := MEASURE_BO with ATTRIBUTE with {
        isAlias: false
    }
    AGGREGATION := "sum" | "count" | "min" | "max" ... // to be refined
    DIMENSIONAL_BO := BO with {
            type: "dimensionalAttribute",
        semantic: SEMANTIC,
        hierarchies: [ HIERARCHY_ID ]
    }
    // In some implementations, the end results of adding elements in the query //context is a "query
generation" into an SQL Statement (or similar language) that could //be executed by a query execution
engine in order to get the result from a repository
    DIMENSIONAL_ATTRIBUTE := DIMENSIONAL_BO with ATTRIBUTE with {
        isAlias: false
    }
    DETAIL_BO := BO with {
        type: "detail",
        semantic: SEMANTIC
    }
    DETAIL := DETAIL_BO with ATTRIBUTE with {
        isAlias: false
    }
```

Code Snippet I

```
ASSOCIATION := {
    sourceAttributes: [ ATTRIBUTE_ID ]
    target : FQN,
    targetKey : KEY
}
SEMANTIC := "geo" | "time" | "label" | ... // to be detailed
HIERARCHY := {
    id: HIERARCHY_ID,
    type: HIERARCHY_TYPE,
    name: string // indexed
    <property> : <value>
}
HIERARCHY_ID := FQN
HIERARCHY_TYPE := "lbh" | "pch" // specific features of hierarchies are
described below
LEVEL_BASED_HIERARCHY := HIERARCHY with {
    type: "levelBasedHierarchy",
    levels: {
        <LEVEL>: ATTRIBUTE_ID
    }
}
CONTENT := {
    id: CONTENT_ID,
    type: "content",
    kind: CONTENT_KIND,
    name?: string, // indexed if present
    <property> : <value>
}
CONTENT_KIND := "visualization" | "story" | ... // to be refined
BUSINESS_OBJECT := MEASURE | DIMENSIONAL_BO | DIMENSION | DETAIL |
LEVEL_BASED_HIERARCHY | MEASURE_ATTRIBUTE | DIMENSIONAL_ATTRIBUTE
| DETAIL_ATTRIBUTE
```

Figure 5:
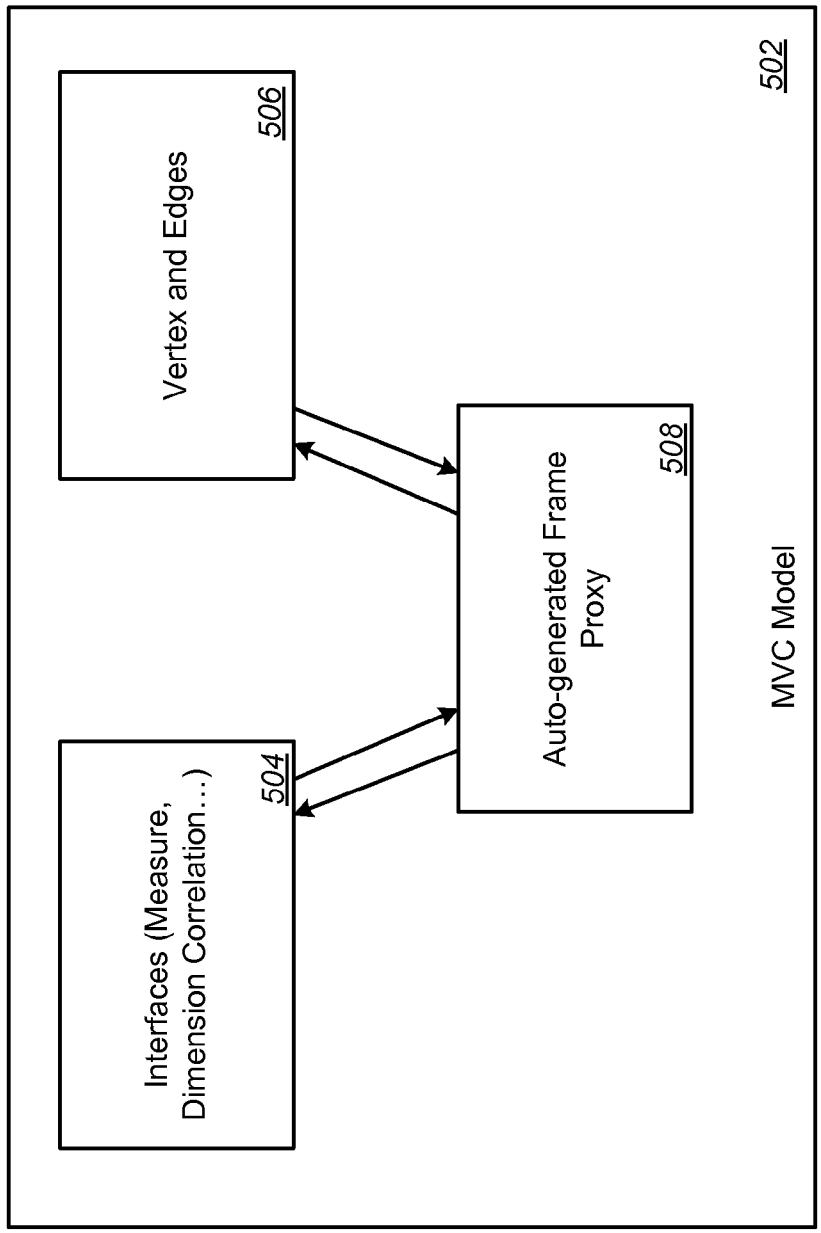
FIG. 5 is a block diagram of an example model used to implement a knowledge graph.

FIG. 5 is a block diagram of an example model used to implement a knowledge graph. The model shown here illustrates a Model View Controller (MVC) model 502. The MVC model 502 is typically controller-based and can provide a distinction between application logic and presentation logic in software applications. In particular, the MVC model 502 can be used to clearly organize and structure graphical user interfaces (i.e., user interface 102 and contextual panel 102b) according to logical units. As shown, interfaces 504 and vertex/edges 506 can send and receive data from auto-generated frame proxy 508. In some implementations, the knowledge graph 112 may be implemented with the MVC Model. The model may pertain to the vertex and edges 506 of the graph. Vues may refer to interfaces used to create graph elements. Controllers may be proxy auto-generated by the frame.

Figure 6:
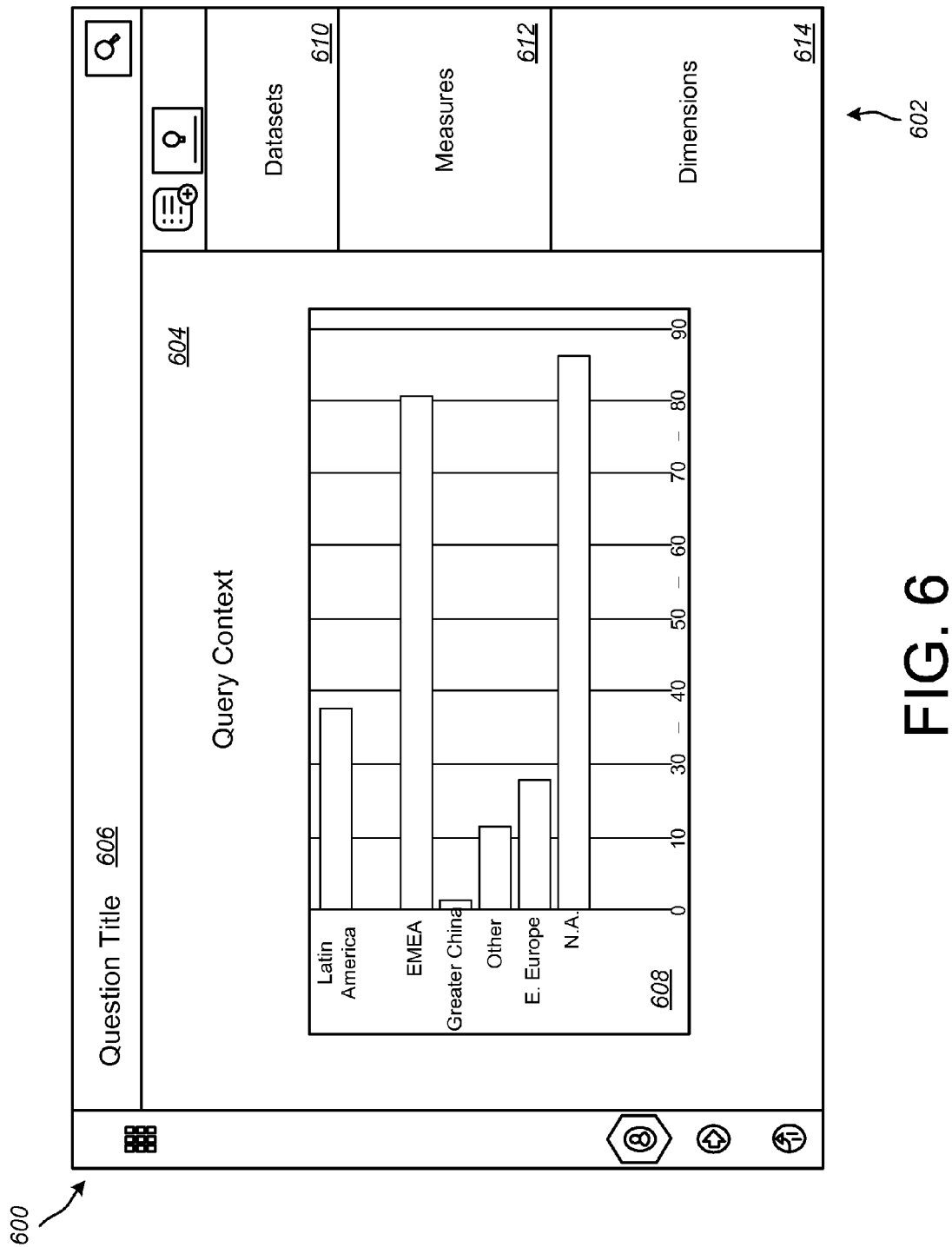
FIG. 6 is a screen shot illustrating an example display view of the contextual user interface within business software executing at a client device.

FIG. 6 is a screen shot illustrating an example display of the contextual user interface 600 within business software executing at a client device. The user interface 600 includes a contextual panel 602 and a query context display 604, each of which include interactive and static content. The content available to be displayed in both contextual panel 602 and query context display 604 can be searchable by a user based on indexed repository information. The contextual panel 602 can be used to display and modify particular query contexts according to a question title 606, for example.

In some implementations, the contextual panel 602 can provide additional visualizations indicating more information about other data displayed in the panel 602 or interface 604. Example visualizations may include a summary of business data, a histogram 608 of business data, filtering controls, related visualizations (e.g., brief description, "did you know . . . " tips/tool tips, search fields, etc.

As shown in FIG. 6, the contextual panel includes datasets 610, measures 612, and dimensions 614. The user can select any or all data from one of the panel items 610-614 to view additional options and to view updated query contexts in display 604. In this example, the query context display 604 includes a histogram depicting sales for a number of regions around the world. The user can modify the histogram by selecting one or more datasets, measures, or dimensions that can be displayed, respectively in datasets 610, measures 612, and/or dimensions 614 in panel 602. Selecting any of the datasets 610, measures 612, and/or dimensions 614 in panel 602 can influence how data is displayed in query context display 604, and thus can change the query context of data being displayed.

Figure 7:
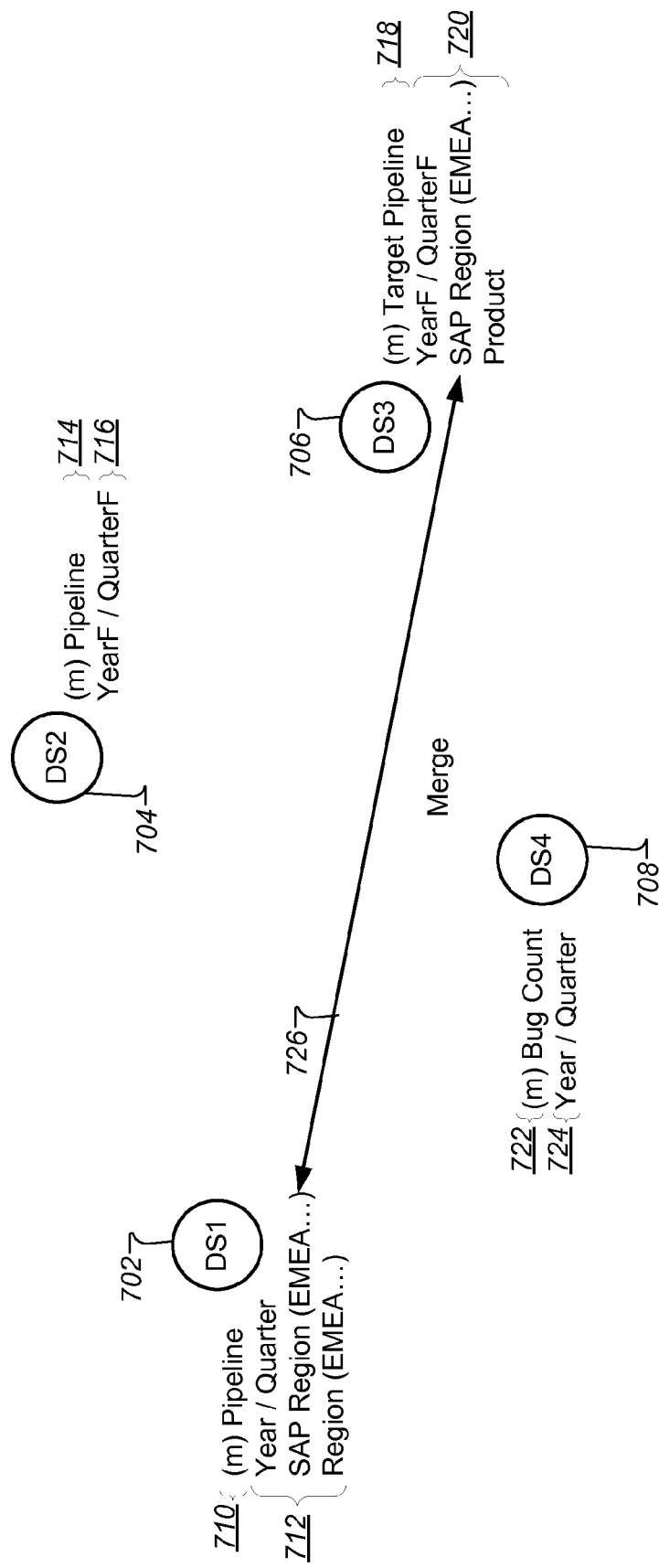
FIG. 7 is an example of implementing the contextual user interface with a knowledge graph.

FIG. 7 is an example of implementing the contextual user interface with a knowledge graph. Four datasets are shown, namely DS1 (dataset 1) 702, DS2 (dataset 2) 704, DS3 (dataset 3) 706, and DS4 (dataset 4) 708. Each dataset 702-708 includes corresponding measures and dimensions. In particular dataset 702 includes a pipeline measure 710, and dimensions 712 corresponding to Year/Quarter, SAP Region (EMEA) [i.e., Europe, Middle East, and Africa], and Region EMEA. Dataset 704 includes a pipeline measure 714 and a YearF/QuarterF dimension 716. Dataset 706 includes a Target Pipeline measure 718 and dimensions 720 corresponding to YearF/QuarterF, SAP Region (EMEA), and Product. Dataset 708 includes a Bug Count measure 722 and a Year/Quarter dimension 724. In general, dimensions can be shown in a particular hierarchy based on predetermined metrics.

In this example, a user may wish to merge dataset 702 and dataset 706 indicated by arrow 726. To do so, the user can begin to select filter signals (e.g., funnel graphics) corresponding to each item presented in the contextual panels depicted in FIGS. 8A-8E.

FIGS. 8A-8E illustrate an example of using datasets 702-708 in FIG. 7 as a user interacts with the contextual user interface. FIGS. 8A-8E depict an example of a user selecting different content from a contextual panel offered in a user interface. As such, each figure in FIGS. 8A-8E is labeled with 800A-E to indicate that the panel is the same panel, but the content in the panel has been updated either by the user or the system 106 or the system 108.

Figure 8A:
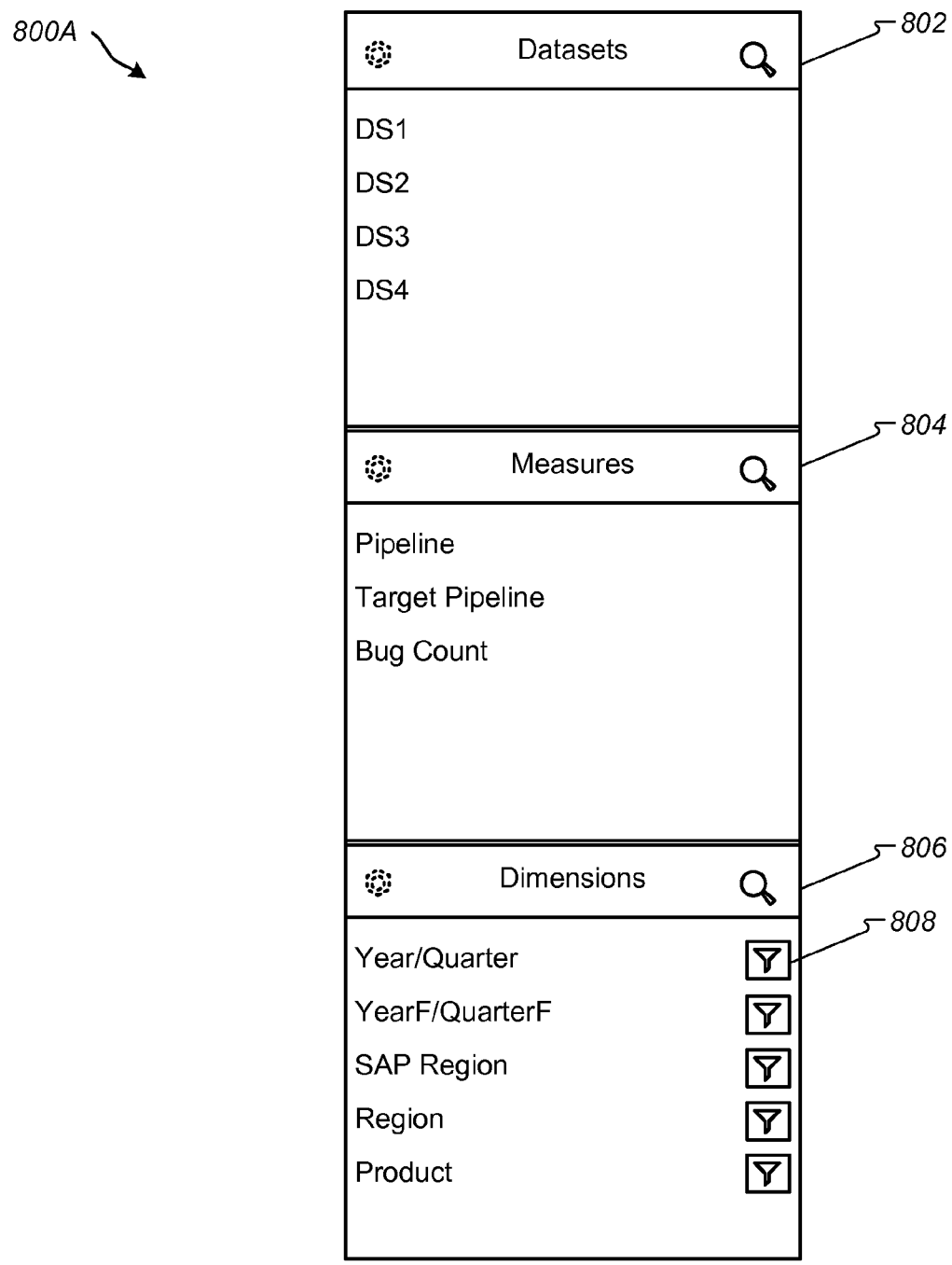
FIGS. 8A-8E illustrate an example of using the datasets of FIG. 7 as a user interacts with a contextual user interface.

As shown in FIG. 8A, a contextual panel 800A depicts example datasets 802, measures 804, and dimensions 806. The datasets 802 include datasets 702-708 and may have been system-selected or user-selected to be presented in the panel 800A. The measures 804 include Pipeline, Target Pipeline, and Bug Count, corresponding to FIG. 7. The dimensions 806 include Year/Quarter, YearF/QuarterF, SAP Region, Region, and Product, corresponding to FIG. 7.

A user can access system 106 and/or 108 to be presented a graphical user interface (such as interface 102 or a similar interface 600). The user can begin to interact with contextual panel 800A to impact the context of the data being presented in the larger user interface 102, for example. The user can select search icons in each respective area 802-806 to search for additional datasets measures, or dimensions. The user can also select each line item of data by selecting the text itself or by selecting a funnel icon, such as icon 808 to view additional details or to have additional content added to the data presented in user interface 102. In the example of panel 800A, the user has not selected anything in the panel 800A and the system has loaded four datasets (e.g., DS1, DS2, DS3, DS4). Selections in panel 800A performed by the user can function to build a query that can be used to seek out particular data and provide a visualization of such data. If nothing is selected, the panel may not depict a particular query context.

In operation, a user may access an interface such as interface 600 (FIG. 6) to enter a search query or question indicating that the user wishes to view revenue by region in North America. The query context can be deciphered and data can be displayed indicating this context to the user. If the user wishes to modify and/or navigate through a query context (i.e., navigate a knowledge graph that provides data associated with the query context), the user can perform a new search, add or remove objects, add or remove filters, interact with the query context within the interface/v visualization, and/or have interaction with system 106 or 108 to obtain a new context.

Figure 8B:
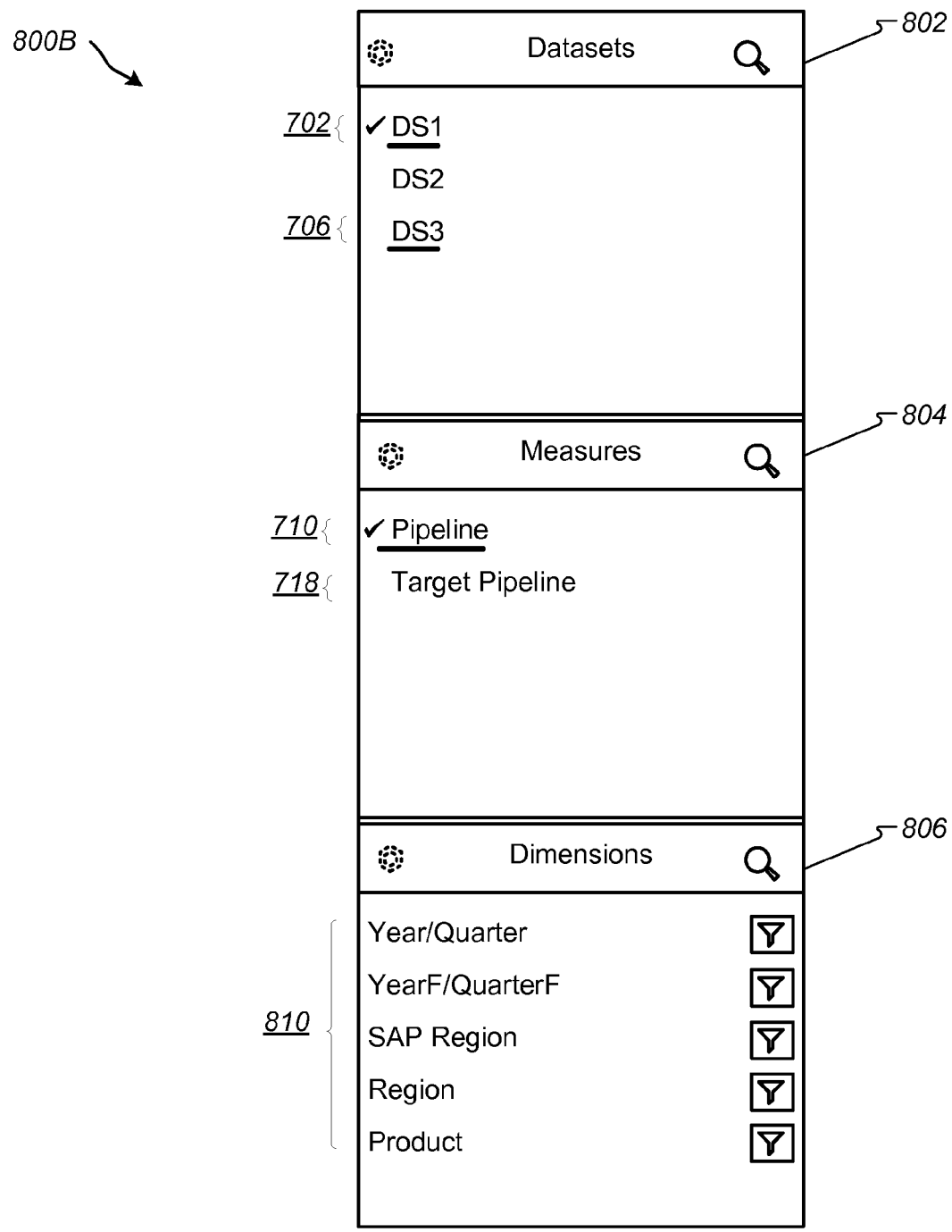

FIG. 8B depicts a contextual panel 800B after the user has made selections of data. In particular, the user has chosen dataset 702, as indicated by the checkmark. However, the system 108 can determine that dataset 706 includes data that may be contextually of interest to the user and can automatically indicate that dataset 706 is also compatible to be blended into other datasets (and measures into other measures) by displaying a visual indication to the user. In this example, the visual indication includes underlined text. In some implementations, the visual indication can include a radial dial, a bolding or other font change, a symbol, or other identifier to indicate that data can be added or combined in some manner.

The underline or other visual indication can provide information to the user about other available datasets (e.g., dataset 706) in which a similar question or query can be answered. For example, the two datasets 702 and 706 include datasets for revenue by region, which may provide an appropriate answer to a user query. The system 106 may have determined (according to FIG. 7), that both datasets included the region measure and could thus be combined in some way.

Similarly, the user has selected pipeline measure 710, which is also underlined by the system 106 to indicate that the Pipeline measure 710 represents a blended measure. For example, if two or more "pipeline" measures exist (e.g., from two or more datasets), the system 106 can list one measure by name and merge the measures into one measure. In particular, the system 106 can list pipeline measure 710, underline the pipeline measure 710 to indicate that it is a blended measure, and can list two datasets 702 and 706 for a user to select. Target pipeline 718 and dimensions 810 depict other selectable measures and dimensions that the user has not selected.

An example user interface that the contextual panel 800B can generate may include a query context which displays datasets 702 and 706 by pipeline measure 710 or by sub-region 720 for as selectable quarter and year (e.g., Q3/2014).

Figure 8C:
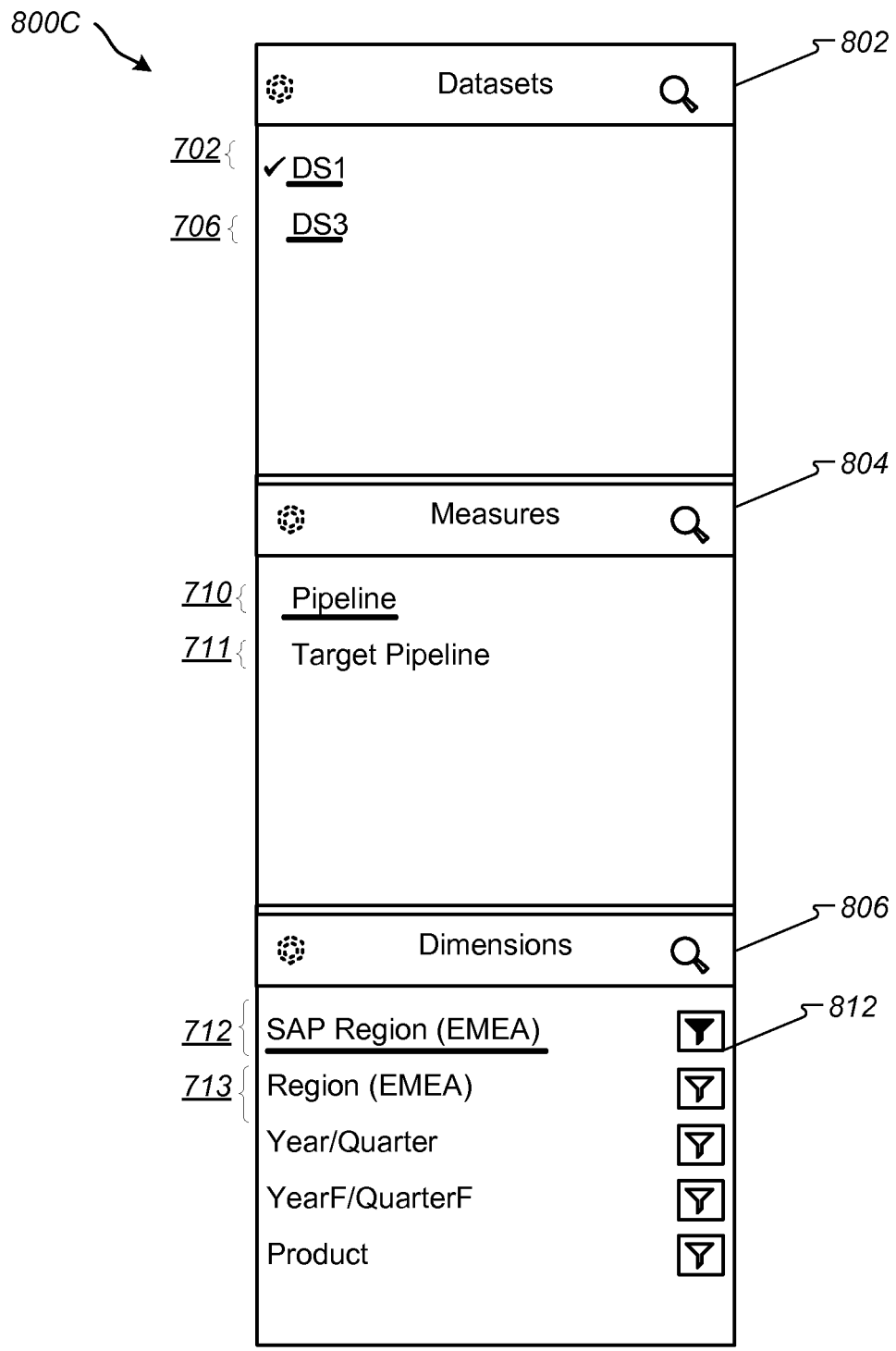

FIG. 8C depicts a contextual panel 800C after the user has made additional selections of data. In this example, the user previously selected pipeline measure 710. In response, the system 108 modified contextual panel 800C to resort and provide additional information on one or more dimensions 806. For example, SAP Region (EMEA) dimension 712 is sorted to the top and visually indicates via an underline that the dimension 712 includes data capable of being blended. In addition, the Region dimension 713 is shown re-sorted. The sorting may be based on relevance to the query context, usage data, or other configurable sorting metric.

At some point, the user can select funnel icon 812 to filter data. The selection can trigger display of a list of values of dimensions in a hierarchy of selectable data. In general, selecting content in the dimension list can affect compatibility and so filters may function to modify which databases and measures are being utilized. In addition, the user can select any of the depicted funnels to be presented with a merged version of data, in the event that there exists two or more available datasets with region, for example.

Figure 8D:
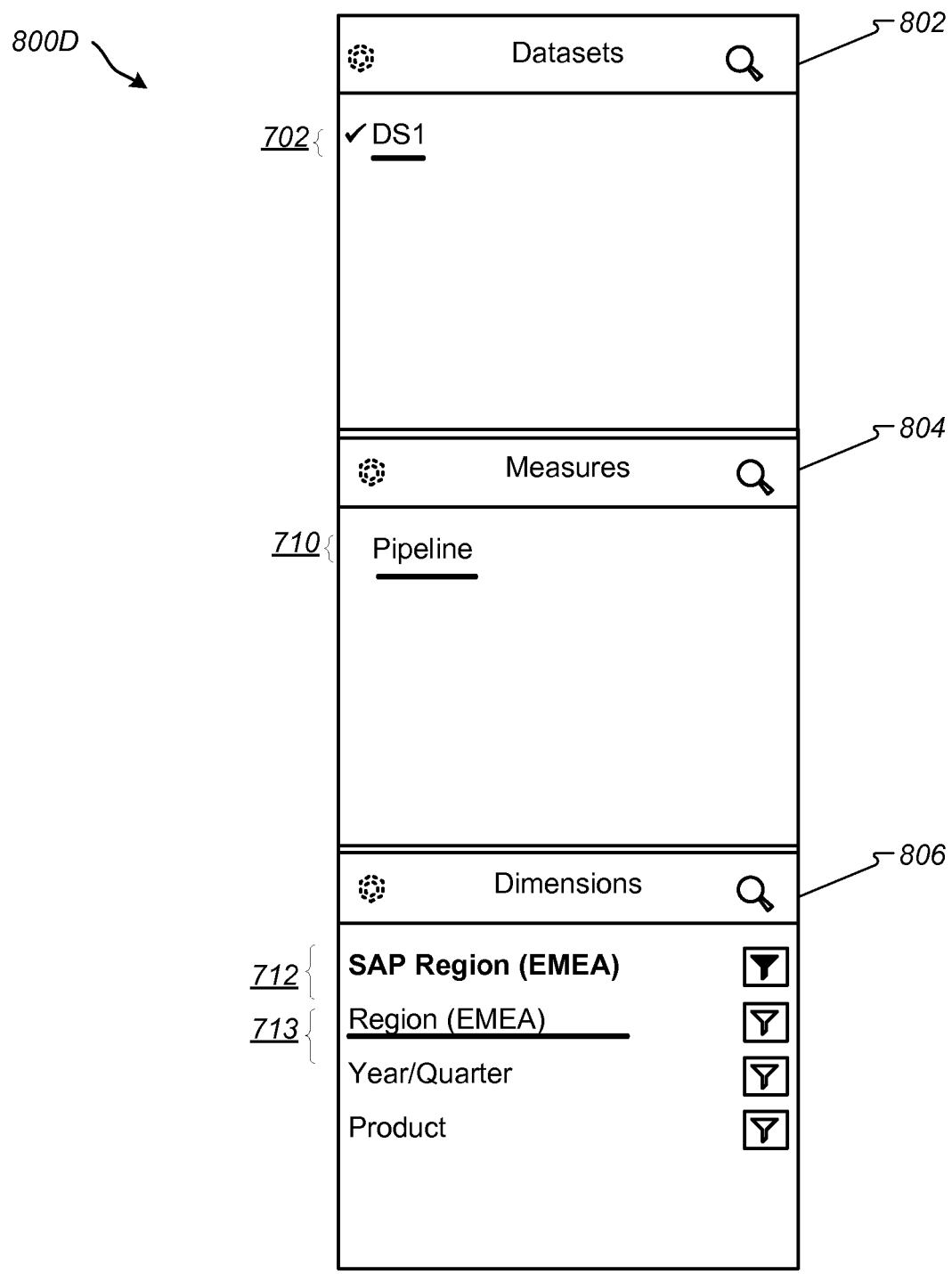

FIG. 8D depicts a contextual panel 800D after the user has made additional selections of data. In the previous panel 800C, the user may have selected funnel icon 812 to further refine data. Selecting funnel icon 812 triggered system 106 to modify the query context to display pipeline EMEA as the Region and as such, has removed data from the panel 800D. Namely, datasets, measures, and dimensions that were determined not compatible with selections 702, 710, and 712 have been removed including dataset 702. In general, the user can also add other measures and dimension that are compatible with the query context simply by selecting them from the panels 800A-E.

In addition, the user may have selected the pipeline Region (EMEA) 713 instead of SAP region (EMEA) and so dataset 702 may be the only compatible dataset and dataset 706 is filtered out. In addition, dimensions that are compatible with the selected region may be shown as blended data.

Figure 8E:
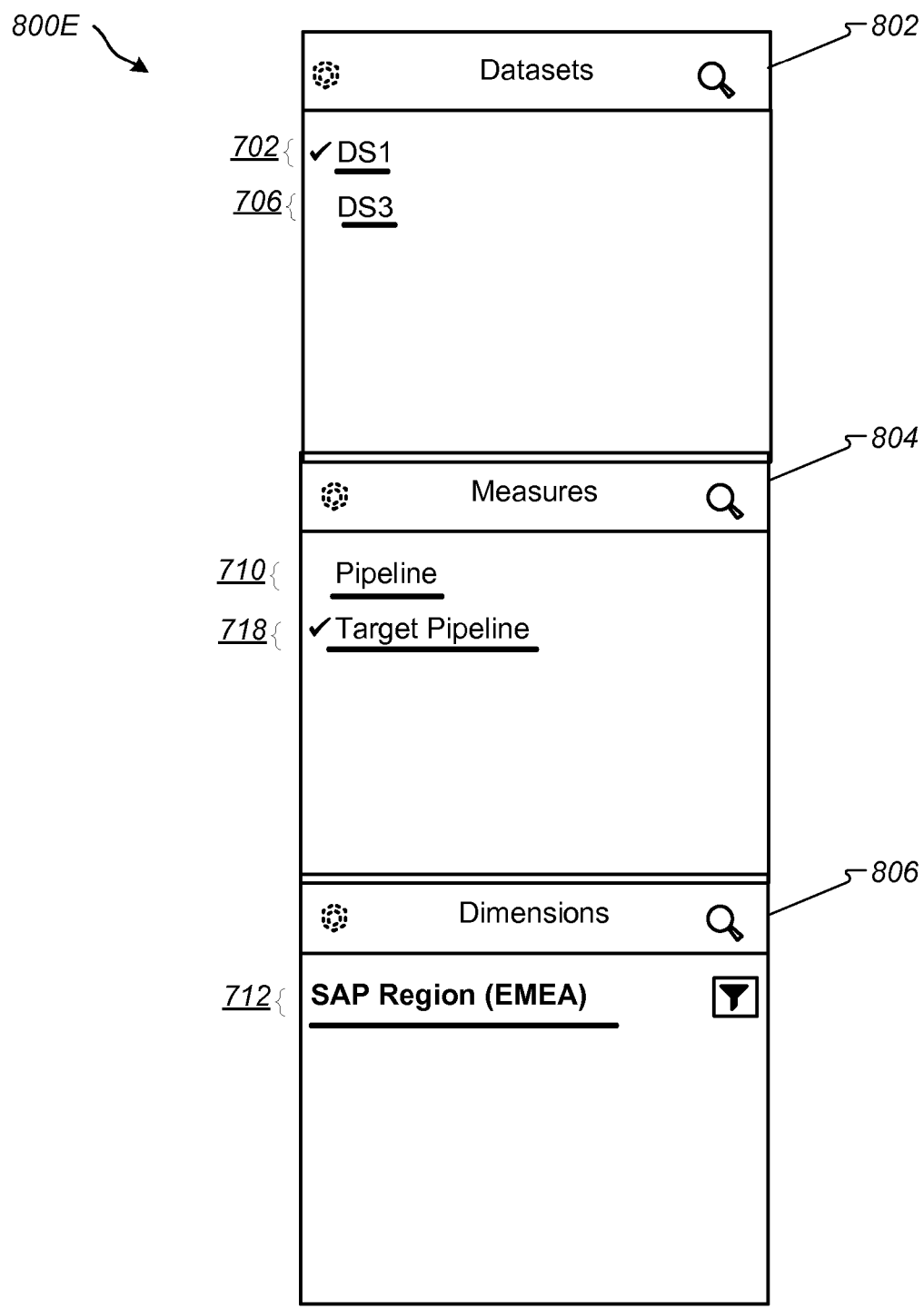

FIG. 8E depicts a contextual panel 800E after the user has made a different selection of data. Namely, the user selected the Target Pipeline measure 718. In this example, selecting measure 718 can trigger dataset 706 to return to selectable datasets 802. In addition, dimensions may be modified to show Target Pipeline dimensions. However, the example shown in FIG. 7 indicates that there are no compatible dimensions available to display under Target Pipeline for datasets 702 and 706

In some implementations, the user may wish to add a Target Pipeline measure to measures area 804 when viewing the panel 800C (FIG. 8C). To do so, the user can select Target Pipeline 711 to view dimensions related to the Target Pipeline measure.

Similarly, the user may wish to add the Target Pipeline measure to measures area 804 when viewing panel 800D (FIG. 8D). To do so, the user can select SAP Region from dimensions area 806 (FIG. 8D), which may bring the user to the panel 800C, shown in FIG. 8C. The system provides for selection of the Target Pipeline measure 711 (FIG. 8C) and upon selection, the user may be provided the panel 800E with Target Pipeline 718 now selected.

In some implementations, any number of context filters based on usage can be applied to data presented in contextual panels 800A-E. The filters can mix and match and/or blend facets (blend region, revenue, and units sold for the region, etc.). In addition, the context filters can automatically display one or more additional selectable object that can be chosen from current datasets and/or blended from other datasets.

Particular advantages can be provided by the systems and methods described in this disclosure. For example, the contextual panels described herein can assist a user with respect to a specific question or query to dissociate between several datasets with the same metadata (e.g. similar dataset published several times with different names). In addition, the contextual panels described herein can display datasets that may be related to similar queries or questions. The panels can additionally be helpful to guide user navigation through a software application by adding measure, dimension and values to the selectable options.

Figure 9:
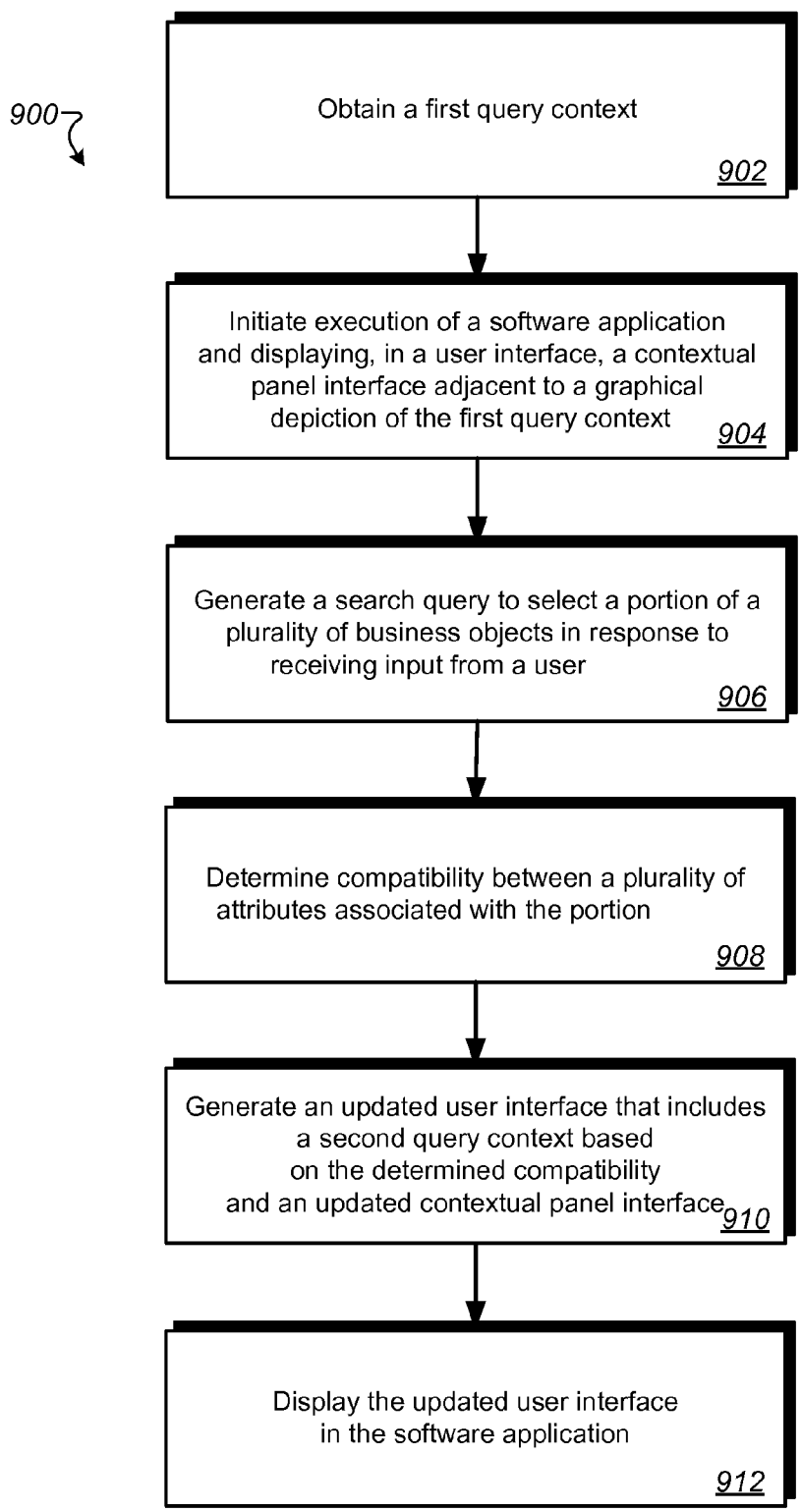
FIG. 9 is a flowchart illustrating example operations of the system of FIG. 1.

Referring to FIG. 9, an exemplary flowchart illustrates a process 900 for implementing the system of FIG. 1. Process 900 includes obtaining a first query context (902). For example, obtaining a first query context may include automatically analyzing a number of datasets by accessing a knowledge graph to calculate compatibility between portions of the plurality of datasets. In particular, system 106 can access the knowledge graph 112 to compare the datasets to associations defined in the knowledge graph.

Process 900 includes initiating, at a user interface, execution of a software application implementing a plurality of business processes associated with a plurality of business objects and displaying, in the user interface, a contextual panel interface adjacent to a graphical depiction of the first query context (904).

In response to receiving input, at the contextual panel interface and from a user of the software application, process 900 includes generating a search query with at least a portion of the input and the first query context, and selecting a portion of the plurality of business objects (906). The portion may be selected based at least in part on the received input. For example, the user may select a dataset from contextual panel 102b to trigger system-based selection (i.e., automatic selection) of a subset of business objects corresponding to the user-selected dataset.

Process 900 includes determining compatibility between a plurality of attributes associated with the portion of the plurality of business objects (908). Determining compatibility between a plurality of attributes associated with the portion of the plurality of business objects includes generating a second query context associated with the plurality of attributes. In particular, generating a second query context associated with the plurality of attributes includes automatically accessing a knowledge graph (e.g., knowledge graph 112) to select additional business objects determined to be compatible with the portion of the plurality of business objects. The compatibility may be based at least in part on predefined similarity nodes and edges in the knowledge graph.

Determining compatibility may also include obtaining one or more datasets that include at least one common attribute. For example, the system 108 can determine common measures and/or dimensions between datasets and can determine that such data will be compatible. In another example, the system 108 can determine that two measures and/or two dimensions are described with the same name, but are represented in different business areas. The system 108 can determine to provide a merged version of such common names based on the similarly named items being compatible. Determining compatibility may also include obtaining a plurality of measures and a plurality of dimensions based at least in part on the second query context and the one or more datasets by comparing the attributes within each measure and dimension with attributes in the datasets.

Process 900 includes generating, for display, an updated user interface that includes a second query context based on the determined compatibility and an updated contextual panel interface that includes interactive controls corresponding to one or more of the one or more datasets and a plurality of measures and a plurality of dimensions (910). In general, a plurality of measures may include a plurality of data objects that quantitatively define at least one attribute in the one or more datasets. A plurality of dimensions may include a plurality of data categories for at least one attribute in the one or more datasets. The second query context may pertain to user selections of datasets, measures, and/or dimensions that triggered a contextual change in the data being presented in contextual panel 102b or interface 102, for example.

In some implementations, the one or more datasets, the plurality of measures, and the plurality of dimensions may each be respectively sorted according to usage metrics, and displayed in the updated user interface in the software application. Usage metrics may include a measured time-based statistic, associated with the user, corresponding to accessing one or more attributes within the one or more datasets, the plurality of measures, or the plurality of dimensions.

Process 900 includes displaying, to the user, the updated user interface in the software application (912). For example, the system 106 can generated updated data for user interface 102 or contextual panel 102b based on the updated context (i.e., the second query context).

In some implementations, the process 900 can include blending one or more of the one or more datasets based at least in part on determining that one or more measures or dimensions overlap between the two datasets. In some implementations, the method 900 can include receiving additional input at one of the interactive controls, and in response, the system 106 may use the additional input to filter out datasets, measures, and dimensions that do not share a query context with data associated with the additional input. In some implementations, the process 900 can include generating, for display, an additional updated user interface that includes a third query context and an additional updated contextual panel interface that includes interactive controls corresponding to the additional input and can display the updated display to the user in the software application.

In some implementations, the method 900 can include removing one or more business objects from the portion of the plurality of business objects based on determining insufficient security credentials for the user of the software application, wherein the removal terminates access, for the user of the software application, to the one or more business objects.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method, the method comprising:
    initiating, for a user interface, a plurality of processes associated with a plurality of datasets, the user interface including at least a contextual panel interface providing access to data hierarchies pertaining to the plurality of datasets;
    determining a first query context associated with the plurality of datasets, the first query context being determined based on data usage patterns associated with a user accessing the user interface;
    displaying, in the user interface, the contextual panel interface adjacent to a graphical depiction of data generated using the first query context, the data usage patterns, and the plurality of datasets, the contextual panel interface depicting selectable data compatible with the first query context, and retrieved from the plurality of datasets;
    in response to receiving input on at least a portion of the selectable data in the contextual panel interface,
        selecting a subset of the plurality of datasets,
        determining compatibility between a plurality of attributes in the subset of the plurality of datasets,
        generating a second query context for the subset of the plurality of the datasets based on the determined compatibility between the plurality of attributes, and
        generating, for display, an updated user interface that includes updated graphical data generated using the second query context, and generating an updated contextual panel interface with updated selectable data corresponding to the second query context, the updated contextual panel interface indicating a merge of at least two datasets in the subset of datasets and including a plurality of measures and a plurality of dimensions compatible with the second query context,
    wherein the second query context modifies the first query context to provide access to additional relevant attributes from the subset of the plurality of datasets and to remove one or more of the plurality of attributes that are incompatible with the input, and
    wherein the determining of compatibility between the plurality of attributes includes selecting at least two datasets in the subset that include at least one common attribute from the plurality of attributes, and selecting, using the second query context and the at least one common attribute, a plurality of data measures and a plurality of dimensions in the subset, the plurality of dimensions being sorted based at least in part on usage patterns associated with the user.

2. The method of claim 1, wherein the plurality of measures include a plurality of data objects that quantitatively define at least one attribute in the plurality of attributes and the plurality of dimensions include a plurality of data categories for the at least one attribute in the plurality of attributes.

3. The method of claim 1, further comprising:
sorting the subset of the plurality of datasets determined to be compatible, the sorting based at least in part on the usage patterns associated with the user;
sorting the plurality of measures, the sorting based at least in part on the usage patterns associated with the user; and
displaying, in the updated user interface, the sorted plurality of datasets having attributes determined to be compatible, the plurality of measures, and the plurality of dimensions.

4. The method of claim 3, wherein the usage patterns include a measured time-based statistic, associated with the user, and corresponding to accessing one or more attributes within the subset of the datasets, the plurality of measures, or the plurality of dimensions.

5. The method of claim 1, wherein the first query context is generated by automatically analyzing the plurality of datasets by accessing a knowledge graph to calculate compatibility between the plurality of datasets.

6. The method of claim 1, wherein generating a second query context associated with the plurality of attributes comprises automatically accessing a knowledge graph to select additional content from the subset of the datasets, the additional content determined to be compatible with the subset of the datasets, the compatibility being based at least in part on predefined similarity of nodes and edges in the knowledge graph.

7. The method of claim 1, further comprising:
blending at least two of the subset of the datasets based at least in part on determining that one or more of the plurality of measures or the plurality of dimensions overlap between the one or more of the plurality of datasets; and
displaying in the updated contextual panel interface, a selectable control corresponding to the blended datasets.

8. The method of claim 1, further comprising:
in response to receiving additional input at one of the interactive controls, using the additional input to filter out datasets, measures, and dimensions that are incompatible with the query context for data associated with the additional input;
generating, for display, an additional updated user interface that includes a third query context and an additional updated contextual panel interface that includes interactive controls corresponding to the additional input; and
displaying, the additional updated user interface and the additional updated contextual panel interface.

9. The method of claim 1, further comprising:
removing one or more datasets from the subset of the datasets based on determining insufficient security credentials for the user of the user interface, wherein the removal terminates access, for the user of the user interface, to the one or more datasets in the subset of the datasets.

10. A computer-implemented system including instructions recorded on a non-transitory computer-readable medium and comprising instructions that, when executed by at least one processor, cause the at least one processor to:
initiate, for a user interface, a plurality of processes associated with a plurality of datasets, the user interface including at least a contextual panel interface providing access to data hierarchies pertaining to the plurality of datasets;
determine a first query context associated with the plurality of datasets, the first query context being determined based on data usage patterns associated with a user accessing the user interface;
display, in the user interface, the contextual panel interface adjacent to a graphical depiction of data generated using the first query context, the data usage patterns, and the plurality of datasets, the contextual panel interface depicting selectable data compatible with the first query context, and retrieved from the plurality of datasets;
in response to receiving input on at least a portion of the selectable data in the contextual panel interface,
select a subset of the plurality of datasets,
determine compatibility between a plurality of attributes in the subset of the plurality of datasets,
generate a second query context for the subset of the plurality of the datasets based on the determined compatibility between the plurality of, and
generate, for display, an updated user interface that includes updated graphical data generated using the second query context, and generating an updated contextual panel interface with updated selectable data corresponding to the second query context, the updated contextual panel interface and including a plurality of measures and a plurality of dimensions compatible with the second query context,
wherein the second query context modifies the first query context to provide access to additional relevant attributes from the subset of the plurality of datasets and to remove one or more of the plurality of attributes that are incompatible with the input, and
wherein the determining of compatibility between the plurality of attributes includes selecting at least two datasets in the subset that include at least one common attribute from the plurality of attributes, and selecting, using the second query context and the at least one common attribute, a plurality of data measures and a plurality of dimensions in the subset, the plurality of dimensions being sorted based at least in part on usage patterns associated with the user.

11. The system of claim 10, wherein the security engine is further configured to remove at least a portion of the data from the contextual panel interface in response to determining insufficient security credentials.

12. The system of claim 10, wherein comparing the data to associations defined in the knowledge graph includes determining associations between information stored in the knowledge graph and determining which of those associations are compatible with the data.

13. The system of claim 10, wherein the query context engine:
monitors the query context in response to receiving user input; and
modifies the query context if the input causes changes in the associations between information stored in the knowledge graph.

14. The system of claim 10, wherein the contextual panel interface comprises:
a first interactive display portion for depicting a plurality of selectable datasets associated with the query context;

a second interactive display portion for depicting a plurality of selectable measures associated with the query context and with at least one of the plurality of selectable datasets;
a third interactive display portion for depicting a plurality of selectable dimensions associated with the query context and with at least one of the plurality of selectable datasets; and
an interactive tool display portion configured to determine a query context in response to receiving a search query and to populate the first, second, and third interactive display portions.

15. A non-transitory recordable storage medium having recorded and stored thereon instructions that, when executed, perform actions of:
   initiating, for a user interface, a plurality of processes associated with a plurality of datasets, the user interface including at least a contextual panel interface providing access to data hierarchies pertaining to the plurality of datasets;
   determining a first query context associated with the plurality of datasets, the first query context being determined based on data usage patterns associated with a user accessing the user interface;
   displaying, in the user interface, the contextual panel interface adjacent to a graphical depiction of data generated using the first query context, the data usage patterns, and the plurality of datasets, the contextual panel interface depicting selectable data compatible with the first query context, and retrieved from the plurality of datasets;
   in response to receiving input on at least a portion of the selectable data in the contextual panel interface, selecting a subset of the plurality of datasets, determining compatibility between a plurality of attributes in the subset of the plurality of datasets, and generating a second query context for the subset of the plurality of the datasets based on the determined compatibility between the plurality of attributes, and
   generating, for display, an updated user interface that includes updated graphical data generated using the second query context, and generating an updated contextual panel interface with updated selectable data corresponding to the second query context, the updated contextual panel interface indicating a merge of at least two datasets in the subset of datasets and including a plurality of measures and a plurality of dimensions compatible with the second query context,
   wherein the second query context modifies the first query context to provide access to additional relevant attributes from the subset of the plurality of datasets and to remove one or more of the plurality of attributes that are incompatible with the input, and
   wherein the determining of compatibility between the plurality of attributes includes selecting at least two datasets in the subset that include at least one common attribute from the plurality of attributes, and selecting, using the second query context and the at least one common attribute, a plurality of data measures and a plurality of dimensions in the subset, the plurality of dimensions being sorted based at least in part on usage patterns associated with the user.

16. The non-transitory recordable storage medium of claim 15, wherein the instructions further comprise:
   sorting the subset of the datasets determined to be compatible, the sorting based at least in part on the usage patterns associated with the user;
   sorting the plurality of measures, the sorting based at least in part on the usage patterns associated with the user; and
   displaying, in the updated user interface, the sorted plurality of datasets having attributes determined to be compatible, the plurality of data measures, and the plurality of data dimensions.

17. The non-transitory recordable storage medium of claim 15, wherein the instructions further comprise:
   in response to receiving additional input at one of the interactive controls, using the additional input to filter out datasets, measures, and dimensions that are incompatible with the query context for data associated with the additional input;
   generating, for display, an additional updated user interface that includes a third query context and an additional updated contextual panel interface that includes interactive controls corresponding to the additional input; and
   displaying, the additional updated user interface and the additional updated contextual panel interface.

* * * * *